United States Patent [19]
Iida

[11] Patent Number: 5,710,539
[45] Date of Patent: Jan. 20, 1998

[54] TIRE AIR-PRESSURE REDUCTION DETECTING APPARATUS

[75] Inventor: Akiko Iida, Osaka, Japan

[73] Assignees: Sumitomo Electric Industrties, Ltd.; Sumitomo Rubber Industries, Ltd., both of Japan

[21] Appl. No.: 351,169

[22] Filed: Nov. 30, 1994

[30] Foreign Application Priority Data

Dec. 7, 1993 [JP] Japan ..................... 5-306737
Dec. 28, 1993 [JP] Japan ..................... 5-349994
Dec. 28, 1993 [JP] Japan ..................... 5-349995

[51] Int. Cl.$^6$ ........................ B60C 23/00
[52] U.S. Cl. ............... 340/444; 340/442; 73/146.4; 73/146.5; 116/34 R
[58] Field of Search .............. 340/444, 442, 340/445; 73/146.5, 146.4; 116/34 R

[56] References Cited

U.S. PATENT DOCUMENTS

| | | | |
|---|---|---|---|
| 5,218,862 | 6/1993 | Hurrell, II et al. | 340/444 |
| 5,248,957 | 9/1993 | Walker et al. | 340/444 |
| 5,343,741 | 9/1994 | Nishihara et al. | 340/444 |
| 5,483,220 | 1/1996 | Kushimoto | 340/444 |

FOREIGN PATENT DOCUMENTS

| | | | |
|---|---|---|---|
| 0 291 217 | 11/1988 | European Pat. Off. | |
| 0441599A2 | 8/1991 | European Pat. Off. | |
| 0 466 535 | 1/1992 | European Pat. Off. | |
| 0489562 | 6/1992 | European Pat. Off. | 340/444 |
| 0554131 | 8/1993 | European Pat. Off. | 340/444 |
| 0 607 689 | 7/1994 | European Pat. Off. | |
| 3 236520 | 4/1984 | Germany | |
| 485118 | 3/1992 | Japan | 340/442 |
| 6286428 | 11/1994 | Japan | |
| 2226434 | 6/1990 | United Kingdom | 340/442 |
| 2246461 | 1/1992 | United Kingdom | 340/444 |
| 93/09964 | 5/1993 | WIPO | |
| 94/06641 | 3/1994 | WIPO | |

OTHER PUBLICATIONS

European Search Report and Annex.

*Primary Examiner*—Jeffery Hofsass
*Assistant Examiner*—Julie B. Liew
*Attorney, Agent, or Firm*—Beveridge, DeGrandi, Weilacher & Young, LLP

[57] ABSTRACT

In accordance with a tire air-pressure reduction detecting apparatus of the present invention, if it is judged that the tires all have a normal air pressure, it is judged whether or not a count value (C) is not less than a steady-state count ($L_2$), and then if the count value (C) is not less than the steady-state count ($L_2$), a counter (CNT) is decremented. That is, the count value (C) is kept to the steady-state count ($L_2$) at the lowest, from which incrementation is started. On the other hand, if it is judged that a tire air pressure is reduced, it is judged whether or not the count value(C) is less than an upper counting limit ($L_1$), and then if the count value (C) is less than the upper counting limit ($L_1$), the counter (CNT) is incremented. That is, the count value (C) is kept to the upper counting limit ($L_1$) at the highest, from which decrementation is started. Then, if the count value (C) is not less than a warning threshold count ($N_1$), a warning is issued, and if the count value (C) is less than a warning stopping threshold count ($N_2$), the warning is stopped. Thus, the frequency of the issuance of erroneous warnings can be reduced.

4 Claims, 19 Drawing Sheets

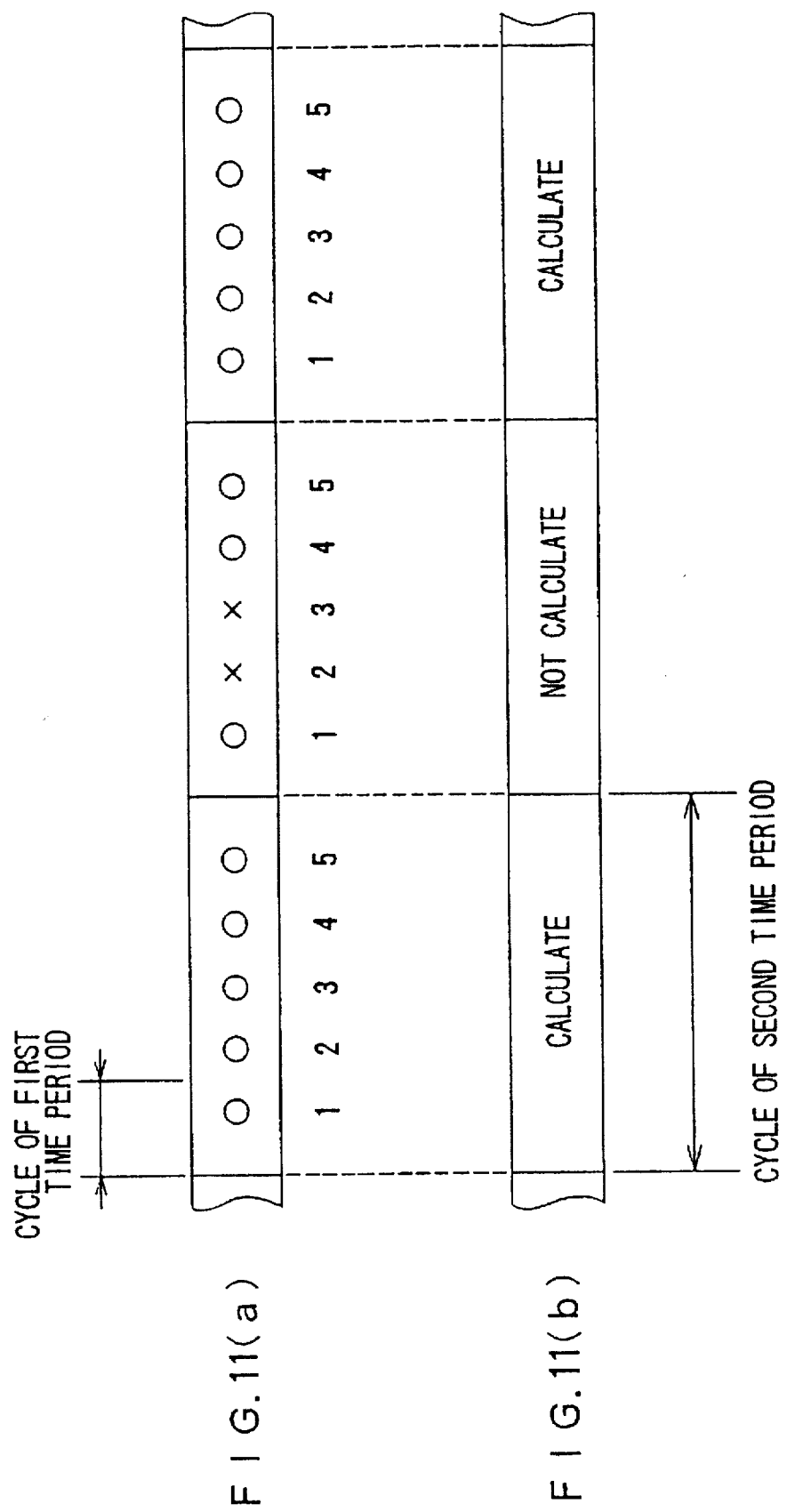

FIG.15(a)

| CALCULATE | NOT CALCULATE | CALCULATE |
|---|---|---|
| (1) (2) (3) (4) (5) | (1) (2) (3) (4) (5) | (1) (2) (3) (4) (5) |

FIG.15(b)

| ○ ○ ○ ○ ○ | ○ × × ○ ○ | ○ ○ ○ ○ |
|---|---|---|
| 1 2 3 4 5 | 1      1 2 | 1 2 3 4 5   1 2 |

FIG.15(c)

| CALCULATE | NOT CALCULATE | CALCULATE |
|---|---|---|

FIG.17(a)

| CALCULATE | | | | | |
|---|---|---|---|---|---|
| (1) | (2) | (3) | (4) | (5) | |
| ○ | ○ | ○ | ○ | ○ | |
| 1 | 2 | 3 | 4 | 5 | |

FIG.17(b)

| NOT CALCULATE | CALCULATE | | | |
|---|---|---|---|---|
| (1) | (1) | (2) | (3) | (4) | (5) |
| ○ | × | × | ○ | ○ | ○ | ○ |
| 1 | | | 2 | 3 | 4 | 5 | 1 | 2 | 3 |

FIG.17(c)

| CALCULATE | CALCULATE |
|---|---|

| ○ ○ ○ ○ | ○ ○ × ...... × | ○ ...... ○ × × ○ ○ ○ |
|---|---|---|
| 1 2 3 4 | 1 2 (1) ...... ($N_2$) | $N_1$ ...... 3 (2) (1) 2 1 |
| | NOT CALCULATE | CALCULATE |

F I G. 19(a)

F I G. 19(b)

TIRE AIR-PRESSURE REDUCTION DETECTING APPARATUS

BACKGROUND OF THE INVENTION

The present invention relates to apparatuses for detecting and warning against a reduction In the air pressure of a tire on a four-wheeled vehicle.

In recent years, there have been invented tire air-pressure reduction detecting apparatuses as a safety device for four-wheeled vehicles such as automobiles, trucks and the like, some of which have already been put into practical use.

The tire air-pressure reduction detecting apparatuses have been developed in recognition of the importance thereof for the following reason. If the air pressure of a tire is reduced, the tire has an increased flexure and the temperature thereof rises, thereby reducing the strength of polymer material of the tire. This will result in the burst of the tire. However, a driver is hardly aware of the reduction in the tire air pressure.

A tire air-pressure reduction detecting process for use in the tire air-pressure reduction detecting apparatuses is, for example, based on a difference among the rotational angular velocities $F_1$, $F_2$, $F_3$ and $F_4$ (which are generally referred to as "rotational angular velocity $F_i$") of four tires $W_1$, $W_2$, $W_3$ and $W_4$ (which correspond to a front left wheel, front right wheel, rear left wheel and rear right wheel, respectively, and are generally referred to as "tire $W_i$") attached to a vehicle.

In accordance with this tire air-pressure reduction detecting process, the rotational angular velocities $F_i$ of the tires $W_i$ are detected on a predetermined sampling cycle $\Delta T$, for example, based on signals output from wheel velocity sensors mounted on the tires $W_i$. If the dynamic load radii of the respective tires $W_i$ (radii as calculated by dividing by $2\pi$ a traveling distance of the vehicle for each turn of the respective tires) are all the same, the rotational angular velocities $F_i$ of the respective tires $W_i$ are also all the same when the vehicle is traveling straight.

The dynamic load radius of the tire $W_i$ is changed, for example, by a change in the air pressure of the tire $W_i$. That is, if the air pressure of the tire $W_i$ is reduced, the dynamic load radius of the tire $W_i$ becomes smaller than that observed when the tire air pressure is normal. Accordingly, the rotational angular velocity $F_i$ of the tire $W_i$ becomes higher than that observed when the tire air pressure is normal. Therefore, the reduction in the air pressure of the tire $W_i$ can be detected based on a difference in the rotational angular velocity $F_i$. A determinant equation for detecting a reduction in the air pressure of the tire $W_i$ is shown below (which is detailed in British Patent Applications No. EP 291217(A) and No. EP 441600(A)):

$$D = \frac{\frac{F_1+F_4}{2} - \frac{F_2+F_3}{2}}{\frac{F_1+F_2+F_3+F_4}{4}} \times 100(\%) \quad (1)$$

Provided that the dynamic load radii of the respective tires $W_i$ are all the same, for example, the rotational angular velocities $F_i$ of the tires $W_i$ are all the same ($F_1=F_2=F_3=F_4$), and the determinant value D is calculated to be 0. Thresholds $D_{TH1}$ and $D_{TH2}$ ($D_{TH1}>0$ and $D_{TH2}>0$) are set for the determinant value D. If the determinant value D satisfies inequality $D<-D_{TH1}$ or $D>D_{TH2}$, it is judged that there exists a tire $W_i$ having a reduced air pressure. If the determinant value D does not satisfy the above inequality, it is judged that there is no tire having a reduced air pressure. When it is judged that there exists a tire $W_i$ having a reduced air pressure, a warning is issued by means of a display device and/or speaker.

Another art for judging the reduction in the air pressure is disclosed in Japanese Unexamined Patent Publication No. 3-50006 (1991). Though a warning is issued on the sampling cycle $\Delta T$ when it is judged that there exists a tire $W_i$ having a reduced air pressure in accordance to the aforesaid prior art, a warning is issued only when a difference in the rotational angular velocity $F_i$ between left and right tires is continuously observed for a predetermined time period in accordance with the art disclosed in this literature. More specifically, the rotational angular velocities $F_1$ and $F_2$ of the front left tire $W_1$ and front right tire $W_2$ or the rotational angular velocities $F_3$ and $F_4$ of the rear left tire $W_3$ and rear right tire $W_4$ are compared with each other, and a count is taken every time there exists any difference between the rotational angular velocities $F_1$ and $F_2$ or between the rotational angular velocities $F_3$ and $F_4$. When the count value reaches a predetermined value, the warning is issued.

Still another art is disclosed in Japanese Examined Utility Model Publication No. 4-11844 (1992). Though influences of various fluctuation factors are not taken into consideration in accordance with the aforesaid prior art, rotational angular velocities $F_i$ which are calculated when a tire $W_i$ seems to be slipped or locked are excluded for the detection of the reduction in the air pressure of tire $W_i$ in accordance with the art disclosed in this literature. More specifically, it is first judged whether or not the ratio $F_1/F_2$ between the rotational angular velocities $F_1$ and $F_2$ of the front left tire $W_1$ and front right tire $W_2$ and the ratio $F_3/F_4$ between the rotational angular velocities $F_3$ and $F_4$ of the rear left tire $W_3$ and rear right tire $W_4$ are both out of a predetermined range, and the respective rotational angular velocities $F_i$ other than those calculated when it is judged that both of the ratios are out of the range are added up for a predetermined time period. Then, it is judged whether or not the air pressure of tire $W_i$ is reduced, based on the sum of the respective rotational angular velocities $F_i$.

Even if the tires $W_1$ to $W_4$ have a normal air pressure, the dynamic load radii of the tires $W_1$ to $W_4$ are not always the same. This is because the tires $W_i$ are manufactured with a certain variation in the dynamic load radius within a standard tolerance (herein after referred to as "initial difference"). It is known that the variation is about 0.1% on the basis of the standard deviation. On the other hand, if the air pressure of tire $W_i$ is reduced by about 0.6 Kg/cm$^2$ (about 30% reduction if the normal air pressure is about 2.0 Kg/cm$^2$), for example, the dynamic load radius changes by about 0.2% compared with that observed when the air pressure is normal. That is, the variation in the dynamic load radius due to the initial difference is about the same as that due to the air-pressure reduction. Accordingly, the difference in the rotational angular velocity $F_i$ due to the initial difference is also about the same as that due to the air-pressure reduction. This means that, even if the determinant value D calculated from the aforesaid equation (1) is not 0, the air pressure of the tires $W_i$ can be normal. Therefore, the reduction in the air pressure can not be detected accurately only by a method of using the determinant value D on the basis of 0.

Further, when tires are replaced or charged with air, a slight variation in the dynamic load radius equivalent to the initial difference may be observed. This also prevents accurate detection of the reduction in the air pressure.

To solve this problem, correction factors should be calculated to correct the initial difference before the detection of air-pressure reduction is carried out. (This process is hereinafter referred to as "initial correction process".) In this initial correction process, the correction factors $C_i$ are calculated, for example, with the rotational angular velocity of any one of the tires $W_i$ being set as a correction reference, when all the tires $W_1$, $W_2$, $W_3$ and $W_4$ have a normal air pressure, and then the rotational angular velocities $F_i$ of the other tires $W_i$ are multiplied by the calculated correction factors.

Besides the problem of the initial difference, there exists another problem concerning the traveling state of a vehicle in an air-pressure reduction detecting process. When the vehicle is traveling at a high forward/backward acceleration, the tires may slip. The rotational angular velocities $F_i$ detected when the tires slip may result in an erroneous judgement. To solve this problem, Japanese Unexamined Patent Publication No. 63-305011 (1988) and Japanese Examined Utility Model Publication No. 4-11844 (1992), for example, disclose arts in which data of the rotational angular velocities $F_i$ detected under inappropriate conditions can be excluded.

In accordance with the art disclosed in Japanese Unexamined Patent Publication No. 63-305011 (1988), a forward/backward acceleration detecting unit installed in a vehicle outputs signals indicative of a forward/backward acceleration, and if the forward/backward acceleration continuously exceeds a predetermined level (for example, 0.03 G) for a predetermined time period (for example, 6 seconds), data of rotational angular velocities $F_i$ detected at that time are excluded.

When the forward/backward acceleration is high (for example, when a load is shifted forward or backward in a rapidly accelerated vehicle), the driving tires of the vehicle may slip. Since the slippage of the left and right driving tires does not always balancedly occur, the rotational frequencies of the driving tires differ from each other even when the air pressure of the tires is normal during the straight traveling of the vehicle. As a result, the determinant value D calculated from the aforesaid equation (1) is not equal to 0, and an erroneous judgement is made that the air pressure is reduced. The art disclosed in this literature improves the accuracy of the detection of the air-pressure reduction by excluding the data of the rotational angular velocities $F_i$ obtained when the forward/backward acceleration is high.

On the other hand, in accordance with the art disclosed in Japanese Examined Utility Model Publication No. 4-11844 (1992), the ratio $F_1/F_2$ of a rotational angular velocity $F_1$ of a front left wheel to a rotational angular velocity $F_2$ of a front right wheel and the ratio $F_3/F_4$ of a rotational angular velocity $F_3$ of a rear left wheel to a rotational angular velocity $F_4$ of a rear right wheel are calculated, and it is judged whether or not the ratios $F_1/F_2$ and $F_3/F_4$ are within a predetermined range. If the rotational angular velocity ratios $F_1/F_2$ and $F_3/F_4$ are out of the predetermined range, it is considered that any of the tires $W_i$ is slipped or locked, and data of the rotational angular velocities $F_i$ obtained at that time are excluded.

When any of the tire $W_i$ is slipped or locked, the outputs of the wheel velocity sensors have a certain variation and, therefore, the data of the rotational angular velocities $F_i$ include certain errors. The art disclosed in this literature realizes highly accurate detection of the reduction in the air pressure by excluding the data of rotational angular velocities $F_i$ which may include such errors.

However, the tire air-pressure reduction detecting processes described above have the following drawbacks:(A)In accordance with the art disclosed in Japanese Unexamined Patent Publication No. 63-305011 (1988), the data of the rotational angular velocities $F_i$ detected when the vehicle is traveling at a lower speed are not excluded. Since the wheel velocity sensor is incapable of providing a correct output when the vehicle is traveling at a low speed, the data of the detected rotational angular velocities $F_i$ include errors. Therefore, this art has a disadvantage that the reduction in the air pressure can not be correctly detected based on the rotational angular velocities $F_i$ having such errors.

On the other hand, in accordance with the art disclosed in Japanese Examined Utility Model Publication No. 4-11844 (1992), a steering angle sensor for detecting the steering angle of a steering wheel is requisite for preventing erroneous detection of the air-pressure reduction during the cornering of the vehicle. Since the air-pressure reduction detecting apparatus of this art requires a complicated construction, the apparatus tends to be expensive.

Though the foregoing prior arts intend to solve the disadvantages by performing the initial correction process before the air-pressure reduction detecting process, the initial correction process itself may still have drawbacks similar to those which the prior arts intend to solve (including a variation in the rotational frequency of the driving tires due to a high forward/backward acceleration). That is, the data of the rotational angular velocities $F_i$ still include errors in the initial correction process performed before the air-pressure reduction detecting process, hence the reduction in the air pressure can not be accurately detected. Therefore, what should be done first is to improve the accuracy of the initial correction process.

(B) The dynamic load radius is influenced by such factors as a variation within a standard tolerance which is caused at the production of the tires $W_i$, the surface conditions of a road including roughness of the road, and vehicle traveling states including a velocity of the vehicle, the curvature radius of a road on which the vehicle is traveling, and the acceleration in a forward or backward direction (forward/backward acceleration) and the lateral acceleration (lateral G) of the vehicle. Even if the air pressure of the tires $W_i$ is normal, the dynamic load radius is fluctuated due to the aforesaid factors, thereby fluctuating the rotational angular velocities $F_i$ of the tire $W_i$.

The fluctuation in the rotational angular velocity $F_i$ occurs due to various fluctuation factors both when the air pressure is reduced and when the air pressure is normal. In accordance with the art utilizing the aforesaid determinant equation (1), even if the air pressure is normal, the determinant value D may take a value out of the range between $-D_{TH1}$ and $D_{TH}$ as shown in FIG. 10(a). On the contrary, even if the air pressure is reduced, the determinant value D may take a value within the range between $-D_{TH1}$ and $D_{TH}$ as shown in FIG. 10(b). As a result, the following problems occur:

① An erroneous warning is issued when the air pressure is normal; and

② A warning is not issued even when the air pressure is reduced.

In either case, the issuing and stopping of the warning are frequently repeated, thereby losing the reliability of the warning against drivers. Thus, the art utilizing the determinant equation (1) has a problem of the fluctuation in the determinant value D.

On the other hand, in accordance with the art disclosed in Japanese Unexamined Patent Publication No. 3-50006 (1991), the warning is issued after the condition is monitored for a predetermined time period and, therefore, the problem ① could be eliminated. However, if the difference in the rotational angular velocity $F_i$ between right and left tires $W_i$ which may be caused due to various fluctuation factors is continuously detected for a certain time period (whether short or long) when the air pressure is normal, the count value may be added up to the predetermined value, and an erroneous warning may be issued. Therefore, this art also suffers the problem of erroneous warnings which may be issued if the vehicle travels for a long time.

In this art, no consideration is given to the aforesaid problem ②.

(C) The fluctuation in the determinant value D which is caused due to various fluctuation factors is of substantially the same order as that which is caused due to the reduction in the air pressure. Therefore, erroneous detection of the reduction in the air pressure may occur when the air pressure is not reduced.

In accordance with the art disclosed in Japanese Examined Utility Model Publication No. 4-11844 (1992), only the rotational angular velocities $F_i$ calculated when it is judged that both of the ratios $F_1/F_2$ and $F_3/F_4$ are out of the predetermined range are excluded for the detection of the air-pressure reduction. Therefore, all the various fluctuation factors are not taken into consideration. Accordingly, this art can not provide means for assuredly detecting the reduction in the air pressure of tire $W_i$ at any time.

SUMMARY OF THE INVENTION

It is a first object of the present invention to provide a tire initial difference correcting process for use in a tire air-pressure reduction detecting apparatus which can highly accurately and quickly correct the initial difference of tires, thereby correctly detecting the reduction in the tire air pressure.

It is a second object of the present invention to provide a tire air-pressure reduction detecting apparatus which can improve a warning reliability.

It is a third object of the present invention to provide a tire air-pressure reduction detecting apparatus which can assuredly detect the reduction in the tire air pressure.

(1) In accordance with one feature of the present invention, to achieve the aforesaid first object, there is provided a tire initial difference correcting process, comprising the steps of: calculating a velocity of a vehicle; judging whether or not the calculated velocity is greater than a predetermined threshold level; determining to employ rotational angular velocities of tires, only when it is judged that the calculated velocity is greater than the predetermined threshold level, for correcting an initial difference in dynamic load radii of the tires based on a variation in performance and air pressure of the tires; obtaining correction factors based on the rotational angular velocities determined to be employed for correcting the initial difference; and correcting the initial difference based on the correction factors thus obtained.

In accordance with another feature of the present invention, there is provided a tire initial difference correcting process, comprising the steps of: detecting forward/backward accelerations based on rotational angular velocities of tires; judging whether or not the detected forward/backward accelerations are lower than a predetermined threshold level; determining to employ the rotational angular velocities, only when it is judged that the detected forward/backward accelerations are lower than the predetermined threshold level, for correcting an initial difference in dynamic load radii of the tires based on a variation in performance and air pressure of the respective tires; obtaining correction factors based on the rotational angular velocities determined to be employed for correcting the initial difference; and correcting the initial difference based on the correction factors thus obtained.

With these arrangements of the present invention, the initial difference correction is made by excluding the rotational angular velocities detected when the vehicle is traveling at a low speed which may include erroneous rotational angular velocity data or those detected when the forward/backward acceleration is high and such phenomena as slippage of the tires frequently occur. Therefore, the initial difference of the tires can be highly accurately corrected.

Accordingly, the reduction in the tire air pressure can be highly accurately detected. This will be useful for safety driving.

In the tire initial difference correcting process of the present invention, the initial difference may be otherwise corrected by using rotational angular velocity data collected until a traveling distance of the vehicle calculated based on the rotational angular velocities reaches a predetermined straight traveling distance.

In accordance with this process, the initial difference is corrected based on an average of the correction factors which are calculated based on rotational angular velocity data collected until the traveling distance of the vehicle reaches a predetermined straight traveling distance. The vehicle has only to travel a predetermined straight distance for the correction of the tire initial difference. Therefore, the time required for the correction of the initial difference can be significantly reduced, for example, by setting the straight traveling distance relatively short.

Further, in the tire initial difference correcting process of the present invention, the initial difference may be otherwise corrected based on an average of the correction factors which are calculated based on rotational angular velocity data collected until the traveling distance of the vehicle reaches a predetermined straight traveling distance.

In accordance with this process, since the initial difference is corrected based on the average of the correction factors, the correction of the initial difference can be made more accurately than in the conventional process.

(2) In accordance with still another feature of the present invention, to achieve the aforesaid second object, there is provided a tire air-pressure reduction detecting apparatus comprising: a counting means for counting the number of judgement results obtained by an air-pressure reduction judging means in an ascending or descending order which depends on whether a judgement result obtained by the air-pressure reduction judging means indicates that a tire air pressure is reduced or that the tire air pressure is not reduced, said counting means being adapted to prevent a count value from exceeding a predetermined steady-state count which supports the judgement that the tire air pressure is not reduced; and a warning means for issuing a warning when the count value obtained by the counting means reaches a predetermined warning threshold count which supports the judgement that the tire air-pressure is reduced.

With this arrangement of the present invention, if a state where the tire air pressure is not reduced is maintained during the traveling of a vehicle, the counting is made in a counting order which supports the judgement that the tire air pressure is not reduced until the count value reaches the steady-state count, and the count value is finally settled at the steady-state count.

If the judgements that the tire air pressure is reduced are thereafter made continuously, the counting is made in the reverse order. At this time, the counting is started from the aforesaid steady-state count. Then, the counting is further made a predetermined number of times in that reverse order, and the count value reaches the predetermined warning threshold count.

Thus, the counting is made in an ascending or descending order which depends on whether the judgement indicates that the tire air pressure is reduced or that the tire air pressure is not reduced. Therefore, a warning process is not affected by an erroneous judgement which may temporarily occur, and the frequency of the issuance of erroneous warnings can be reduced.

Further, by setting a steady-state count, since the predetermined steady-state count serves as a kind of a lower counting limit, a time required for the count value to reach the warning threshold count can be reduced. Therefore, such a conventional problem that it takes a long time for the warning to be issued can be solved.

The aforesaid tire air-pressure reduction detecting apparatus may be otherwise arranged such that the counting means is adapted to count up to a predetermined upper counting limit which supports the judgement that the tire air pressure is reduced, and such that the warning means is adapted to stop warning when the count value reaches a predetermined warning stopping threshold count which supports the judgement that the tire air pressure is not reduced.

With this arrangement of the present invention, if a state where the tire air pressure is not reduced is maintained during the traveling of a vehicle, the count value is settled at the steady-state count as previously mentioned. At this time, if erroneous judgements are made due to such influential factors as a vehicle traveling state and road state, the counting is made in the ascending order toward the upper counting limit. Then if the erroneous judgement state further continues, the count value reaches the upper counting limit. However, since the actual tire air pressure is not reduced, the counting is made in the reverse order. At this time, the counting is started from the upper counting limit. Thereafter, when the count value reaches the warning stopping threshold count after the counting is further made a predetermined number of times in that reverse order, the warning is immediately stopped. Thus, even if an erroneous warning is issued when the actual tire air pressure is not reduced, the erroneous warning can be immediately stopped.

On the other hand, if the tire air pressure is actually reduced, the counting is made in the ascending order toward the upper counting limit. When the count value reaches the warning threshold count, a warning is issued. At this time, if an erroneous judgement that the tire air pressure is not reduced is made due to such influential factors as the vehicle traveling state, road state or the like, the counting is made in the reverse order. However, the warning is not stopped until the count value reaches the warning stopping threshold count. Since the tire air pressure is actually reduced, the counting is made again in the ascending order toward the upper counting limit when a correct judgement is made, and the warning is continuously issued.

Thus, if the tire air pressure is actually reduced, the warning can be continuously issued without being stopped. Therefore, the reliability of the warning against a driver can be improved.

In accordance with yet another feature of the present invention, there is provided a tire air-pressure reduction detecting apparatus comprising: a time measuring means; a memory means for storing a judgement result obtained by an air-pressure reduction judging means during a predetermined time period; a count judging means for judging, when the length of a time period measured by the time measuring means reaches a predetermined time length, whether a count value stored in the memory means for judgement results indicating that a tire air pressure is reduced is not less than a predetermined first count value; and a warning means for issuing a warning when it is judged by the count judging means that the count value is not less than the predetermined first count value.

With this arrangement of the present invention, a warning is issued, if the count of the judgement results indicating that the tire air pressure is reduced exceeds the predetermined first count value during the predetermined time period. Since such influential factors as the vehicle traveling state and road state may temporarily affect the judgement for the tire air-pressure reduction, the count of erroneous judgements for the tire air-pressure reduction due to these influential factors may be kept low within the predetermined time period. Accordingly, temporarily occurring erroneous judgements do not trigger a warning, thereby reducing the frequency of the issuance of erroneous warnings.

The aforesaid tire air-pressure reduction detecting apparatus may be otherwise arranged such that the count judging means is adapted to judge, when the length of a time period measured by the time measuring means reaches the predetermined time period, whether or not the count value stored in the memory means for judgement results indicating that the tire air pressure is reduced is less than a predetermined second count value which is set to be less than the first count value, and such that the warning means is adapted to stop the warning when it is judged by the count judging means that the count value is less than the predetermined second count value.

With this arrangement of the present invention, the warning is stopped, if the count of the judgement results indicating that the tire air pressure is reduced is kept lower than the predetermined second count value during a predetermined time period. Even if an erroneous warning is issued when the tire air pressure is not reduced, the erroneous warning can be immediately stopped, because the count of erroneous judgements for the tire air-pressure reduction is kept relatively low within the predetermined time period. On the other hand, in the case that the tire air pressure is actually reduced, the probability of mistakenly stopping the warning can be reduced, because the count of erroneous judgements indicating that the tire air pressure is not reduced is kept relatively low within the predetermined time period.

In accordance with still another feature of the present invention, there is provided a warning issuing/stopping process for issuing and stopping a warning based on a judgement result of whether or not a tire air pressure is reduced, wherein a warning is issued when the counting of judgement results indicating that a tire air pressure is reduced is repeated a predetermined number of times, and the warning is stopped when the counting of judgement results indicating that the tire air pressure is not reduced is repeated a predetermined number of times.

With this arrangement of the present invention, a warning is issued only when the counting of the judgement results indicating that the tire air pressure is reduced is repeated the predetermined number of times. Since such influential factors as the vehicle traveling state and road state which may lead to an erroneous judgement temporarily affect the judgement of the air-pressure reduction as previously mentioned, the count of the erroneous judgements is significantly lower than that of the correct judgements. Therefore, the frequency of the issuance of erroneous warnings can be reduced.

On the other hand, when the counting of the judgement results indicating that the tire air pressure is not reduced is repeated the predetermined number of times, the warning is stopped. Therefore, even if the counting of erroneous judgements is accidentally repeated the predetermined number of times or more, and erroneous warning is issued when the tire air pressure is not reduced, the erroneous warning can be stopped immediately after the counting of correct judgements is repeated the predetermined number of times or more. Further, even if an erroneous judgement is made when the tire air pressure is actually reduced, the warning is not mistakenly stopped unless erroneous judgements are continuously made the predetermined number of times or more.

(3) In accordance with yet another feature of the present invention, there is provided a tire air-pressure reduction judging process, comprising the steps of: detecting on a cycle of first time period a vehicle traveling state in relation to such factors as a velocity of a vehicle, a curvature radius of a road on which the vehicle is traveling, lateral and forward/backward accelerations of the vehicle; judging on the cycle of first time period whether or not the detected vehicle traveling state is suitable for judging whether or not a tire air pressure is reduced; and judging whether or not the tire air pressure is reduced, by employing rotational angular velocities of tires calculated only when it is judged that the detected vehicle traveling state is suitable for judging whether or not the tire air pressure is reduced, without employing the rotational angular velocities calculated when it is judged that the detected vehicle traveling state is not suitable for judging whether or not the tire air pressure is reduced.

With this arrangement of the present invention, the rotational angular velocities calculated only when it is judged that the detected vehicle traveling state is suitable for judging whether or not the tire air pressure is reduced are employed for judging whether or not the tire air pressure is reduced. The traveling state suitable for judging whether or not the tire air pressure is reduced means a traveling state, typically, a constant-speed straight traveling, which does not affect the rotational angular velocities to be calculated. Thus, the reduction in the tire air pressure can be assuredly detected.

In accordance with still another feature of the present invention, there is provided a tire air-pressure reduction detecting apparatus comprising: a traveling state detecting means for detecting on a cycle of first time period a vehicle traveling state in relation to such factors as a velocity of a vehicle, a curvature radius of a road on which the vehicle is traveling, and lateral and forward/backward accelerations of the vehicle; a traveling state judging means for judging on the cycle of first time period whether or not the vehicle traveling state detected by the traveling state detecting means is suitable for judging whether or not a tire air pressure is reduced; a memory means for storing data of a judgement result obtained by the traveling state judging means, if the judgement result indicates that the vehicle traveling state detected by the traveling state detecting means is not suitable for judging whether or not the tire air pressure is reduced; an adder means for adding up rotational angular velocities of tires calculated by a rotational angular velocity calculating means during a cycle of second time period which is equivalent to an integer multiple of the first time period; and an air-pressure reduction judging means being adapted to refer to the data stored in the memory means to judge whether or not the tire air pressure is reduced based on a sum of the rotational angular velocities added up by the adder means, if there is not stored the data of the judgement result indicating that the vehicle traveling state is not suitable, and to prohibit judging whether or not the tire air pressure is reduced during the cycle of second time period, if there is stored the data of the judgement result indicating that the vehicle traveling state is not suitable.

With this arrangement of the present invention, the judgement of whether or not the tire air pressure is reduced is based on the sum of the rotational angular velocities added up during the cycle of second time period which is equivalent to the integer multiple of the first time period. Therefore, even if any of the rotational angular velocities calculated on the cycle of first time period is influenced by such factors as the road state, the influence can be eliminated. Since the judgement of whether or not the tire air pressure is reduced is made only when all the vehicle traveling states detected a plurality of times during the cycle of second time period are suitable for making the judgement, the rotational angular velocities used for the judgement are hardly influenced by the vehicle traveling states.

Thus, the rotational angular velocities which have little influence of the vehicle traveling state and road state can be selectively employed for the judgement of whether or not the tire air pressure is reduced, so that the reduction in the tire air pressure can be assuredly detected.

In accordance with yet another feature of the present invention, there is provided a tire air-pressure reduction detecting apparatus comprising: a traveling state detecting means for detecting on a cycle of first time period a vehicle traveling state in relation to such factors as a velocity of a vehicle, a curvature radius of a road on which the vehicle is traveling, and lateral and forward/backward accelerations of the vehicle; a traveling state judging means for judging on the cycle of first time period whether or not the vehicle traveling state detected by the traveling state detecting means is suitable for judging whether or not a tire air pressure is reduced; an adder means for adding up rotational angular velocities of tires calculated by a rotational angular velocity calculating means during a cycle of second time period which is equivalent to an integer multiple of the first time period; and an air pressure reduction judging means for judging whether or not the tire air pressure is reduced, based on a sum of the rotational angular velocities added up by the adder means, only when a judgement is continuously made a predetermined number of times by the traveling state judging means that the vehicle traveling state detected by the traveling state detecting means is suitable for judging whether or not the tire air pressure is reduced.

With this arrangement of the present invention, the judgement of whether or not the tire air pressure is reduced is made only when the judgement is continuously made the predetermined number of times that the detected vehicle traveling state is suitable for judging whether or not the tire air pressure is reduced. This means that more accurate rotational angular velocities with little influence of the vehicle traveling state and road state are efficiently used for the detection of the air-pressure reduction. Therefore, the reduction in the tire air pressure can be more assuredly and quickly detected.

In accordance with still another feature of the present invention, there is provided a tire air-pressure reduction detecting apparatus comprising: a traveling state detecting means for detecting on a cycle of first time period a vehicle traveling state in relation to such factors as a velocity of a vehicle, a curvature radius of a road on which the vehicle is traveling, and lateral and forward/backward accelerations of the vehicle; a traveling state judging means for judging on the cycle of first time period whether or not the vehicle traveling state detected by the traveling state detecting means is suitable for judging whether or not a tire air pressure is reduced; an adder means for adding up rotational angular velocities of tires calculated by a rotational angular velocity calculating means, if it is judged by the traveling state judging means that the vehicle traveling state detected by the traveling state detecting means is suitable for judging whether or not the tire air pressure is reduced; and an air-pressure reduction judging means for judging whether or not the tire air pressure is reduced, based on a sum of the rotational angular velocities added up by the adder means, when a count of judgement results obtained by the traveling state judging means indicating that the vehicle traveling state detected by the traveling state detecting means is suitable for judging whether or not the tire air pressure is reduced reaches a predetermined count.

The aforesaid tire air-pressure reduction detecting apparatus may be otherwise arranged so as to clear the sum of the rotational angular velocities added up by the adder means when it is continuously judged a predetermined number of times by the traveling state judging means that the vehicle traveling state detected by the traveling state detecting means is not suitable for judging whether or not the tire air pressure is reduced.

With this arrangement, the judgement of whether or not the tire air pressure is reduced is made, when it is judged the predetermined number of times that the vehicle traveling state detected a plurality of times is suitable for judging whether or not the tire air pressure is reduced. This means that more accurate rotational angular velocities with little influence of the vehicle traveling state and road state are efficiently and selectively employed for the detection of the air-pressure reduction. Therefore, the reduction in the tire air pressure can be more assuredly and quickly detected.

These and other objects and aspects of the present invention will become apparent from the following description with reference to the attached drawings.

BRIEF DESCRIPTION OF THE DRAWINGS

FIGS. 11(a) and 11(b) are each a diagram for explaining a general operation of a tire air-pressure reduction detecting apparatus according to a fifth embodiment of the present invention.

FIGS. 15(a) through 15(c) are each a diagram for explaining a general operation of a tire air-pressure reduction detecting apparatus of the present invention.

FIGS. 17(a) through 17(c) are each a diagram for explaining a general operation of a tire air-pressure reduction detecting apparatus of the present invention.

FIGS. 19(a) and 19(b) are each a diagram for explaining a general operation of a tire air-pressure reduction detecting apparatus of the present invention.

DETAILED DESCRIPTION OF THE EMBODIMENTS

I. Construction of Tire Air-Pressure Reduction Detecting Apparatus

Figure 3:
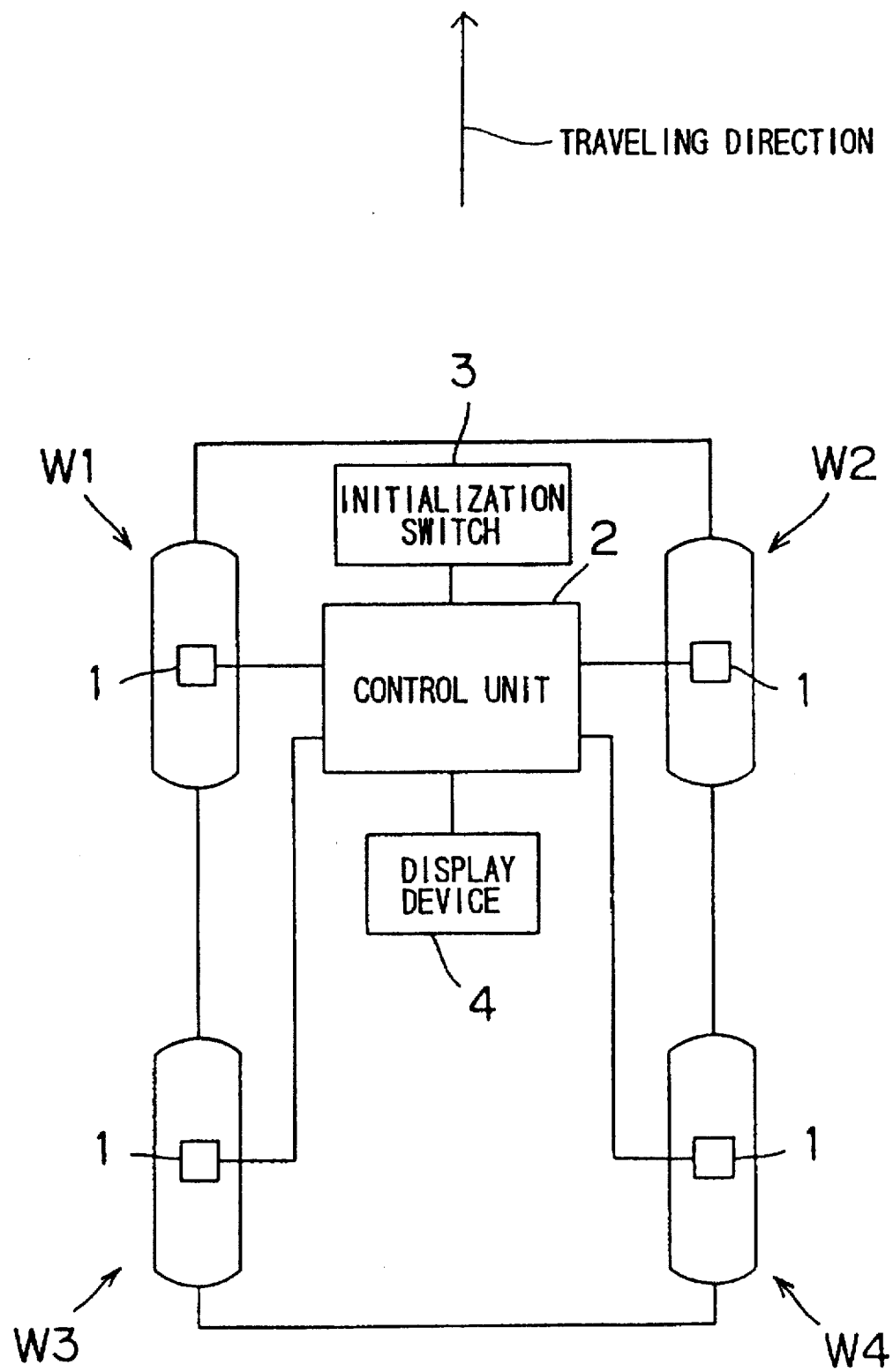
FIG. 3 is a block diagram illustrating a construction of a tire air-pressure reduction detecting apparatus.

FIG. 3 is a block diagram illustrating the construction of a tire air-pressure reduction detecting apparatus. The tire air-pressure reduction detecting apparatus has wheel velocity sensors 1 of a known construction each provided to tires $W_1$, $W_2$, $W_3$ and $W_4$ on four wheels. Outputs of the wheel velocity sensors 1 are sent to a control unit 2. The control unit 2 has such members as a CRT and an initialization switch 3 which is operated by a driver, and is connected to a display device 4 for indicating a tire having a reduced air pressure, which will be described later.

Figure 4:
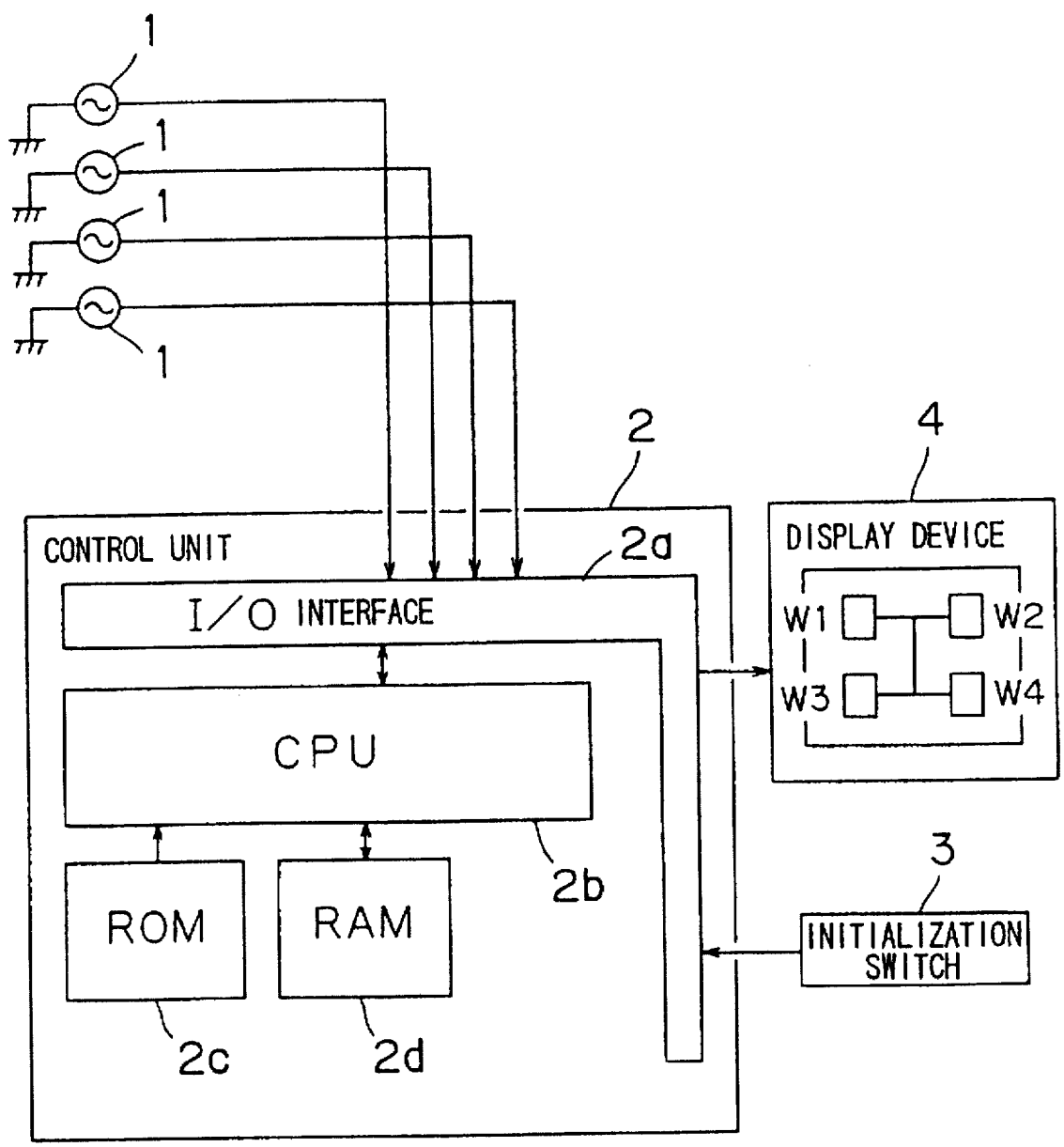
FIG. 4 is a block diagram illustrating the electrical construction of a tire air-pressure reduction detecting apparatus.

FIG. 4 is a block diagram illustrating the electrical construction of the tire air-pressure reduction detecting apparatus. The control unit 2 has a microprocessor-based hardware construction including an I/O interface 2a for sending and receiving signals to/from external devices, a CPU 2b serving for central processing, a ROM 2c storing control-operation programs for the CPU 2b, and a RAM 2d for storing data which is temporarily written and read out for the control operation performed by the CPU 2b. As will be described later, the RAM 2d has a rotational angular velocity memory area for storing data of rotational angular velocities $F_i$ useful for an initial correction process, a velocity memory area for storing data of a vehicle velocity obtained one cycle ago, and a distance memory area for storing data of a vehicle traveling distance. (Rotational angular velocities $F_i$ (i=1, 2, 3 and 4) correspond to tires $W_1$, $W_2$, $W_3$ and $W_4$ throughout the specification.)

From the wheel velocity sensors 1 are output pulse signals (hereinafter referred to as "wheel velocity pulse signals") corresponding to the rotational frequency of the tire $W_i$. More specifically, the wheel velocity sensors 1 each comprise a sensor rotor having a plurality of teeth (for example, 49 or 98 teeth) provided inside the wheel of the tire $W_i$, and output a signal generated in accordance with the number of teeth passing through the wheel velocity sensor 1 while the sensor rotor is rotated. The CPU 2b calculates the rotational angular velocities $F_1$, $F_2$, $F_3$ and $F_4$ of the respective tires $W_1$, $W_2$, $W_3$ and $W_4$ on a predetermined sampling cycle $\Delta T$, based on the wheel velocity pulse signals output from the wheel velocity sensors 1.

The CPU 2b detects velocities $V_i$ of the respective tires $W_i$, based on the rotational angular velocities $F_i$. Provided that the radii of the tires $W_1$, $W_2$, $W_3$ and $W_4$ are all R, the velocities $V_i$ are calculated as follows:

$$V_i = R \times F_i \tag{2}$$

Further, the CPU 2b detects forward/backward accelerations $A_i$ of the respective tires $W_i$, based on the detected velocities $V_i$. More specifically, the CPU 2b stores the detected velocities $V_i$ of the tires $W_i$ as reference velocities $VB_i$ in the velocity memory area of the RAM 2d. Based on differences between the reference velocities $VB_i$ stored in the velocity memory area and velocities $V_i$ of the tires $W_i$ detected after the sampling cycle $\Delta T$ is elapsed, the CPU 2b calculates the forward/backward accelerations $A_i$ of the tires $W_i$ from the following equation (3):

$$A_i = (V_i - VB_i)/\Delta T \tag{3}$$

Still further, the CPU 2b judges whether or not the vehicle is traveling straight. This judgement is based on whether or not differences or ratios between the rotational angular velocities $F_1$ and $F_2$ of front left tire $W_1$ and front right tire $W_2$ and between the rotational angular velocities $F_3$ and $F_4$ of rear left tire $W_3$ and rear right tire $W_4$ are both out of a predetermined range and have the same sign. If the differences or ratios are within the predetermined range, or if the differences or ratios are out of the range and have different signs, it is judged that the vehicle is traveling straight.

Yet further, the CPU 2b calculates the traveling distance L of the vehicle from the following equation (4), based on the rotational angular velocities $F_i$:

$$L = L' + ML \tag{4}$$

where L' is a traveling distance at time $\Delta T$ prior to the present time, and ML is a vehicle traveling distance during the sampling cycle $\Delta T$, which is calculated from the following equation (5):

$$ML = (\Sigma V_i/4) \times \Delta T \tag{5}$$

where $\Sigma V_i$ means the sum of the velocities $V_i$ (i=1 to 4).

Figure 1:
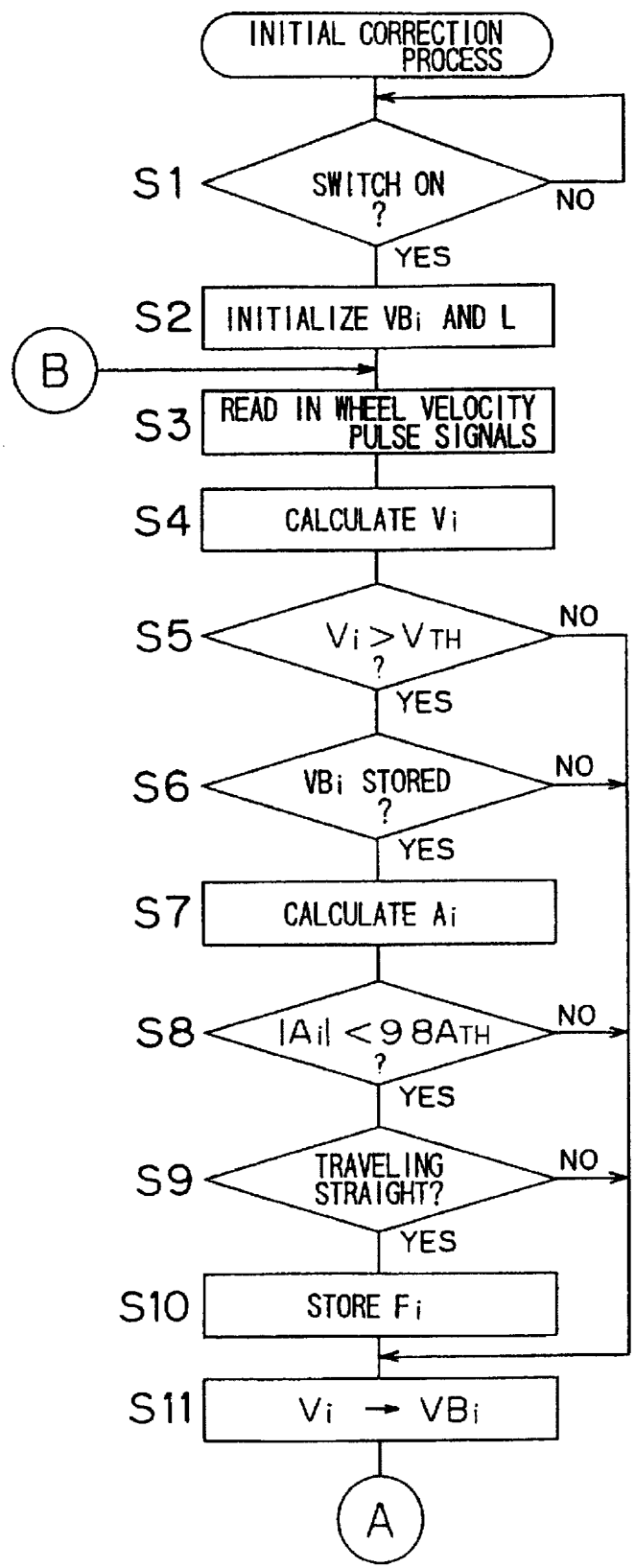
FIG. 1 is a flow chart illustrating an initial correction process performed by a tire air-pressure reduction detecting apparatus of the present invention.
Figure 2:
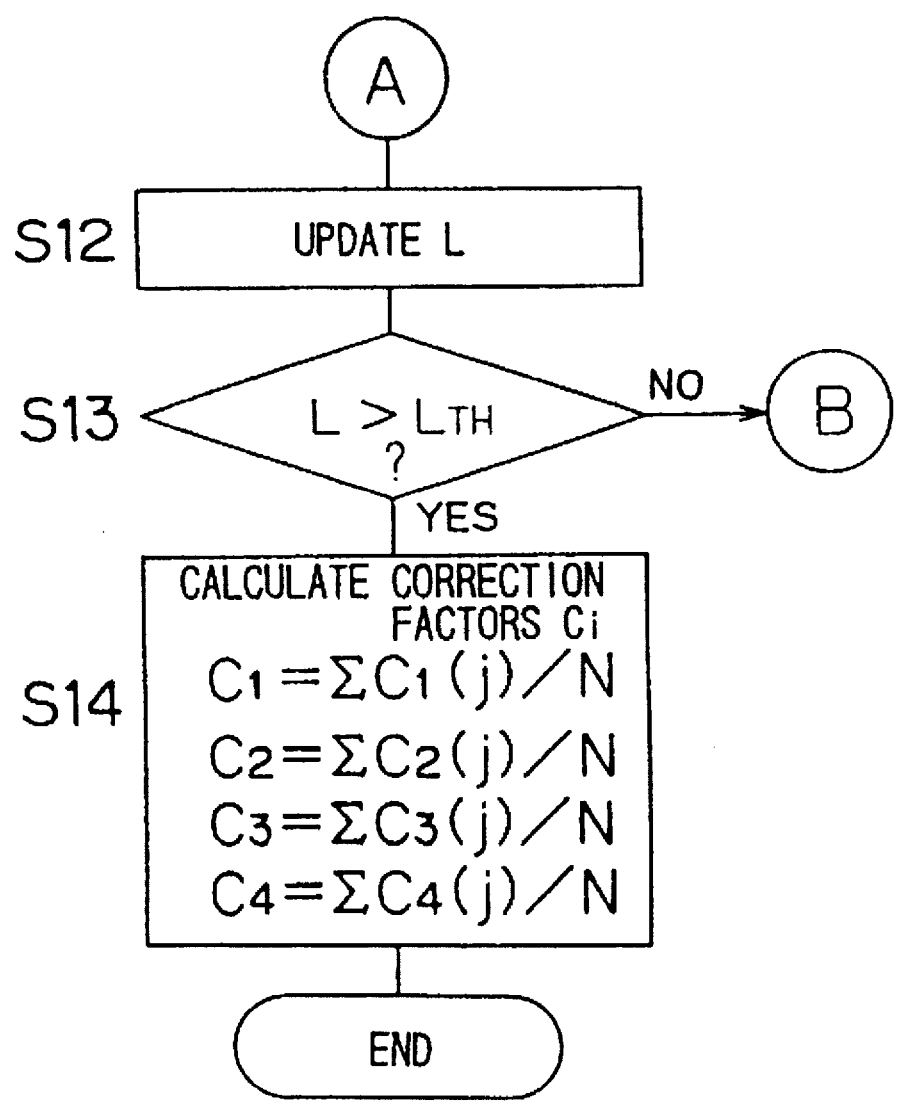
FIG. 2 is a flow chart illustrating the initial correction process which is continued from FIG. 1.

II. First Embodiment (II-1) Initial correction process performed by tire air-pressure reduction detecting apparatus FIGS. 1 and 2 are flow charts illustrating an initial correction process performed by a tire air-pressure reduction detecting apparatus of the present invention before a tire air-pressure reduction detecting process. As previously described in "BACKGROUND OF THE INVENTION", the initial correction process is performed in order to correct errors such as an initial difference among the tires $W_i$, and is started when a driver operates the initialization switch 3 (see FIG. 3) (step S1). In general, a driver should operate the initialization switch 3, for example, when a vehicle is driven for the first time, when any tire is charged with air, or when any tire is replaced. This is because there exists a variation in the dynamic load radius among tires $W_i$ within a standard tolerance in such cases.

If the initialization switch 3 is turned on, the CPU 2b resets (or initializes) reference velocities $VB_i$ and traveling distance L respectively stored in the velocity memory area and in the distance memory area of the RAM 2d (step S2). In turn, wheel velocity pulse signals output from the wheel velocity sensors 1 are read into the CPU 2b (step S3), and rotational angular velocities $F_i$ are calculated based on the wheel velocity pulse signals. Then, velocities $V_i$ of the tires $W_i$ are calculated from the equation (2) (step S4), and the calculated Velocities $V_i$ are compared with a threshold velocity $V_{TH}$ (step S5).

The threshold velocity VTH can be set to 10 Km/h, for example, if the sensor rotor has 49 teeth. As the teeth number increases, the threshold velocity $V_{TH}$ can be set lower. The velocities $V_i$ are compared with the threshold velocity $V_{TH}$ in order to judge whether or not the vehicle is traveling at a speed higher than a predetermined level. As previously described in "BACKGROUND OF THE INVENTION", the outputs of the wheel velocity sensors 1 present a wide variation when the vehicle is traveling at a low speed. Therefore, rotational angular velocities $F_i$ detected when the vehicle is traveling at a low speed are excluded. The comparison may be otherwise made between the threshold velocity $V_{TH}$ and an average $\Sigma V_i/4$ of the velocities $V_i$ of the respective tires $W_i$ calculated in the step S4, or between the threshold velocity $V_{TH}$ and a velocity calculated by using velocity signals which are obtained from a speed meter preliminarily installed in the vehicle.

As the result of the comparison, if any of the velocities $V_i$ of the tires $W_i$ is lower than the threshold velocity $V_{TH}$, the velocities $V_i$ of the respective tires $W_i$ are stored as reference velocities $VB_i$ in the velocity memory area of the RAM 2d (step S11). On the other hand, if all the velocities $V_i$ of the tires $W_i$ are higher than the threshold velocity $V_{TH}$, it is judged whether or not the reference velocities $VB_i$ are already stored in the velocity memory area (step S6). Then, if the reference velocities $VB_i$ are not stored, that is, if the velocity memory area is in an initialized state, the velocities $V_i$ of the respective tires $W_i$ are stored as reference velocities $VB_i$ in the velocity memory area. On the other hand, if the reference velocities $VB_i$ are stored, the forward/backward accelerations $A_i$ of the respective tires $W_i$ are calculated from the aforesaid equation (3) (step S7).

After the forward/backward accelerations $A_i$ are calculated, it is judged whether or not the absolute values of the respective forward/backward accelerations $A_i$ are smaller than a predetermined threshold acceleration $A_{TH}$ (step S8).

$$\left| \frac{V_i - VB_i}{9.8T} \right| < ATH \tag{6}$$

In the above inequality, the threshold acceleration $A_{TH}$ can be set to 0.01, for example. The numeral 9.8 in the denominator of the above inequality is a gravitational conversion factor to G-convert the forward/backward accelerations $A_i$. Then, if any of the calculated forward/backward accelerations $A_i$ is larger than the threshold acceleration $A_{TH}$, it is considered that at least one of the tires has slipped, and the velocities $V_i$ of the respective tires $W_i$ are stored as reference velocities $VB_i$ in the velocity memory area (step S11). On the other hand, if all the calculated forward/backward accelerations $A_i$ are smaller than the threshold acceleration $A_{TH}$, it is judged whether or not the vehicle is traveling straight (step S9).

What is required for this initial correction process is only the difference in the dynamic load radius among the tires $W_i$ which may be caused by the initial difference of the tires $W_i$. Since the dynamic load radius is variable due to a lateral G which is generated when the vehicle is cornering, the rotational angular velocities $F_i$ obtained when it is judged that the vehicle is cornering are not suitable for the initial correction process. Therefore, it should be first judged whether or not the vehicle is traveling straight.

If it is judged that the vehicle is not traveling straight, the velocities $V_i$ of the respective tires $W_i$ are stored as reference velocities $VB_i$ in the velocity memory area. On the other hand, if it is judged that the vehicle is traveling straight, the rotational angular velocities $F_i$ are stored in the rotational angular velocity memory area of the RAM $2d$ (step S10), and the velocities $V_i$ of the respective tires $W_i$ are stored in the velocity memory area (step S11).

After the completion of the step S11, data of a traveling distance L stored in the distance memory area is updated (step S12). That is, the update is made by adding a traveling distance (ML) detected during a sampling period $\Delta T$ to a previously stored traveling distance L. In turn, it is judged whether or not the updated traveling distance L is longer than a predetermined threshold distance $L_{TH}$ (for example, 200 m) (step S13). If the updated traveling distance L is shorter than the threshold distance $L_{TH}$, the foregoing steps S3 through S13 are repeated. On the other hand, if the traveling distance L has reached the threshold distance $L_{TH}$, correction factors $C_i(j)$ are calculated based on the rotational angular velocities $F_i$ stored in the rotational angular velocity memory area (step S14). Provided that the threshold distance LTH is set to 200 m, it takes about 12 to 15 seconds for the vehicle to travel the distance at a speed of about 50 to 60 Km/h.

The correction factors $C_i(j)$ are calculated by setting one of the tires $W_i$ as a correction reference. Provided that the tire $W_1$ is set as the correction reference, the correction factors $C_1(j)$, $C_2(j)$, $C_3(j)$ and $C_4(j)$ employed for the correction of the initial difference of the tires $W_i$ are calculated as follows:

$$C_1(j)=F_1(j)/F_1(j) \quad (7)$$

$$C_2(j)=F_1(j)/F_2(j) \quad (8)$$

$$C_3(j)=F_1(j)/F_3(j) \quad (9)$$

$$C_4(j)=F_1(j)/F_4(j) \quad (10)$$

where $j=1$ to N, and the numeral N is the number of the rotational angular velocities $F_i$ for each of the tires $W_i$ which are stored in the rotational angular velocity area. Accordingly, the correction factors $C_1(j)$, $C_2(j)$, $C_3(j)$ and $C_4(j)$ each have N values.

Then, an average of N values for each of the correction factors $C_1(j)$, $C_2(j)$, $C_3(j)$ and $C_4(j)$ is calculated as follows to improve the accuracy of the correction factors $C_i(j)$.

$$C_1=\Sigma\, C_1(j)/N \quad (11)$$

$$C_2=\Sigma\, C_2(j)/N \quad (12)$$

$$C_3=\Sigma\, C_3(j)/N \quad (13)$$

$$C_4=\Sigma\, C_4(j)/N \quad (14)$$

where $\Sigma\, C_i(j)$ means the sum of $C_i(j)$ ($j=1$ to N). These average values $C_1$, $C_2$, $C_3$ and $C_4$ are employed as the final correction factors.

Instead of the aforesaid correction factors $C_i$, correction factors CF and CR may be employed as the final correction factors, which are calculated as follows. First, correction factors CF(j) and CR(j) are calculated.

$$CF(j)=F_2(j)/F_1(j) \quad (15)$$

$$CR(j)=F_4(j)/F_3(j) \quad (16)$$

Then, average values CF and CR are calculated.

$$CF=\Sigma\, CF(j)/N \quad (17)$$

$$CR=\Sigma\, CR(j)/N \quad (18)$$

Upon completion of the calculation of the correction factors $C_i$, or CF and CR, the initial correction process is completed.

(II-2) Air-pressure reduction detecting process

After the completion of the initial correction process, the tire air-pressure reduction detecting apparatus performs a process of detecting the reduction in the air pressure of tire $W_i$ under an ordinary driving condition. More specifically, after the correction factors are calculated in the initial correction process, the CPU $2b$ obtains corrected values $F_{i0}$ of the rotational angular velocities $F_i$ by multiplying the rotational angular velocities $F_i$ detected on the sampling cycle $\Delta T$ by the correction factors as follows:

$$F_{10}=C_1\times F_1 \quad (19)$$

$$F_{20}=C_2\times F_2 \quad (20)$$

$$F_{30}=C_3\times F_3 \quad (21)$$

$$F_{40}=C_4\times F_4 \quad (22)$$

In the case that the correction factors CF and CR are to be employed, the calculation is as follows:

$$F_{10}=CF\times F_1 \quad (23)$$

$$F_{20}=F_2 \quad (24)$$

$$F_{30}=CR\times F_3 \quad (25)$$

$$F_{40}=F_4 \quad (26)$$

Then, these corrected values $F_{i0}$ are hereafter used in the process of detecting the reduction in the air-pressure of tire $W_i$. This process is based on a determinant value D calculated from the following equation (27):

$$D=\frac{\dfrac{F_{10}+F_{40}}{2}-\dfrac{F_{20}+F_{30}}{2}}{\dfrac{F_{10}+F_{20}+F_{30}+F_{40}}{4}} \times 100(\%) \quad (27)$$

In this embodiment, if the calculated value D satisfies the following inequality (28), it is judged that the air pressure is reduced.

$$D<D_{TH1} \text{ or } D>D_{TH2} \quad (28)$$

where $D_{TH1}$ and $D_{TH2}$ are predetermined constants.

As the result of the air-pressure reduction detecting process thus performed, if the reduction in the air pressure is detected, the detection result is output to be displayed on the display device 4. For example, four indicators corresponding to the tires $W_1$, $W_2$, $W_3$ and $W_4$ are simultaneously lit in the display device 4 as shown in FIG. 4.

As can be seen from the foregoing, in accordance with the tire initial difference correction process of this embodiment, the correction factors $C_i$ are calculated by selectively using only the rotational angular velocities $F_i$ suitable for the initial correction. Therefore, the initial correction process can be performed more accurately, thereby enabling more accurate detection of the reduction in the air pressure of tire $W_i$. This will improve the safety driving.

Further, since the initial correction process can be performed while the vehicle is traveling straight a predetermined distance, the time required for the initial correction process can be significantly reduced.

III. Second Embodiment

Figure 5:
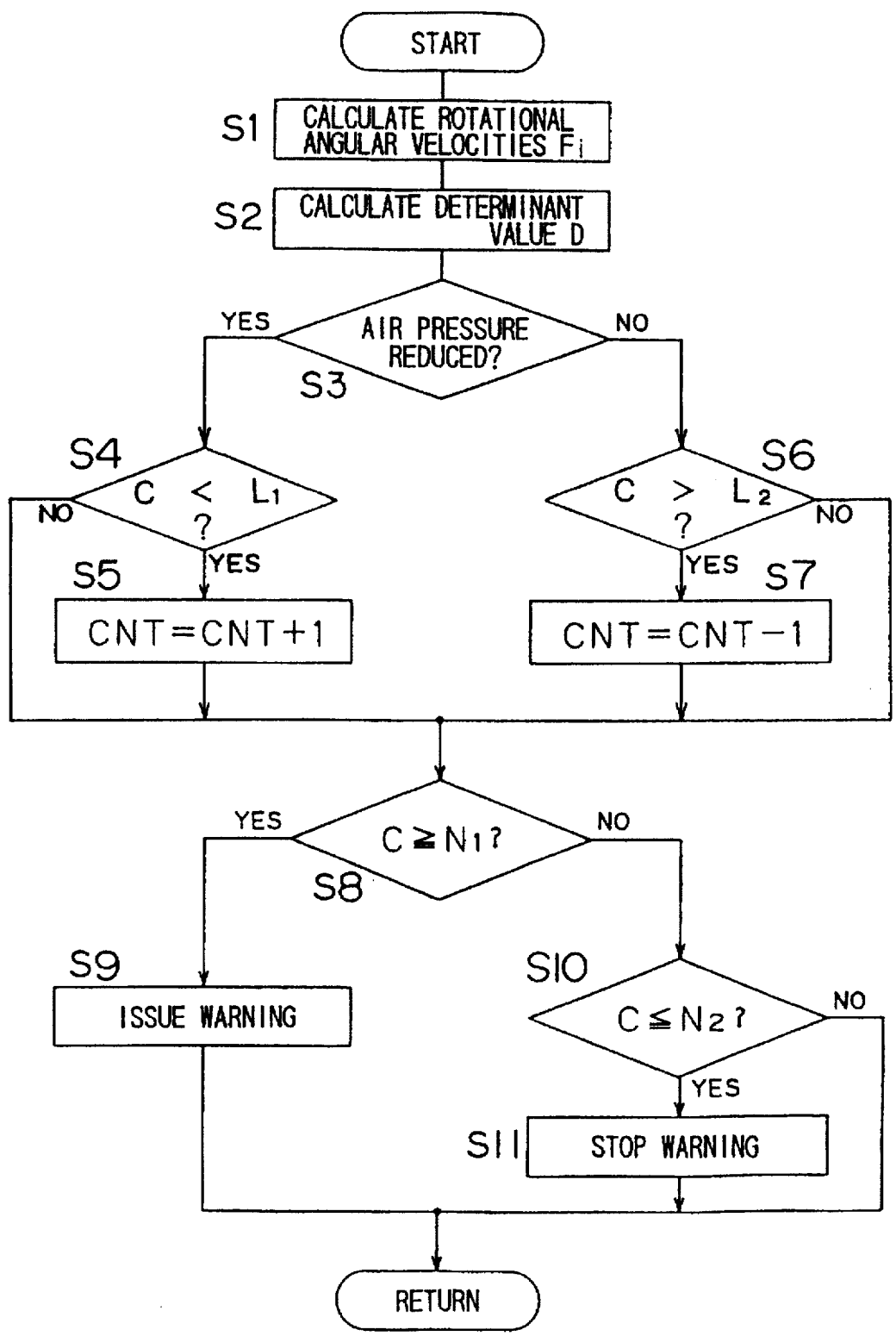
FIG. 5 is a flow chart illustrating a warning operation performed by a tire air-pressure reduction detecting apparatus according to a second embodiment of the present invention.

FIG. 5 is a flow chart illustrating a warning operation performed by a tire air-pressure reduction detecting apparatus. The warning operation is realized by way of a software processing. The CPU 2b calculates rotational angular velocities $F_i$ of the respective tires $W_i$ based on wheel velocity pulse signals which are output from the wheel velocity sensors 1 on the sampling cycle ΔT (sec) during the traveling of the vehicle (step S1). Based on the rotational angular velocities $F_i$ thus obtained, the CPU 2b calculates a determinant value D from the following equation (29) to judge whether or not any of the tires $W_i$ has a reduced air pressure (step S2).

$$D = \frac{\frac{F_1+F_4}{2} - \frac{F_2+F_3}{2}}{\frac{F_1+F_2+F_3+F_4}{4}} \times 100(\%) \quad (29)$$

Then, the CPU 2b judges whether the air pressure of any of the tires $W_i$ is reduced, based on the determinant value D thus obtained (step S3). More specifically, if the determinant value D satisfies the following inequality (30), it is judged that there exists any tire $W_i$ having a reduced air pressure. On the other hand, if the determinant value D does not satisfy the inequality (30), it is judged that all the tires $W_i$ have a normal air pressure.

$$D < -D_{TH1} \text{ or } D > D_{TH2} \quad (30)$$

As the result of the judgement, if the determinant value D satisfies the inequality (30), the CPU 2b judges whether or not a predetermined count value C of a counter CNT is less than a predetermined upper counting limit $L_1$ (for example, $L_1$=10) (step S4). If the count value C is less than the upper counting limit $L_i$, the counter CNT is incremented (step S5), and if the count value C equals the upper counting limit $L_1$, the process goes into a step S8, which will be described later.

On the other hand, if it is judged in the step S3 that the determinant value D does not satisfy the above inequality (30), the CPU 2b judges whether or not the count value C of the counter CNT is greater than a predetermined steady-state count $L_2$ (for example, $L_2$=0) which is set to be less than the upper counting limit $L_1$ (step S6). If the count value C is greater than the steady-state count $L_2$, the counter CNT is decremented (step S7), and if the count value C equals the steady-state count $L_2$, the process goes into the step S8, which will be described later.

The upper counting limit $L_1$ and steady-state count $L_2$ are set in order to promptly deal with such problems as sudden puncture of tire and an erroneous warning. More specifically, if the steady-state count $L_2$ was not set, the count value C would be unlimitedly decreased insofar as the normal state of air pressure was maintained. In such case, when any tire $W_i$ was suddenly punctured, it would take a very long time for the count value C to reach a warning threshold count (which will be described later), resulting in a delayed issuance of the warning. This would pose a danger to safety driving.

Figures 6A, 6B, 6C, 6D:
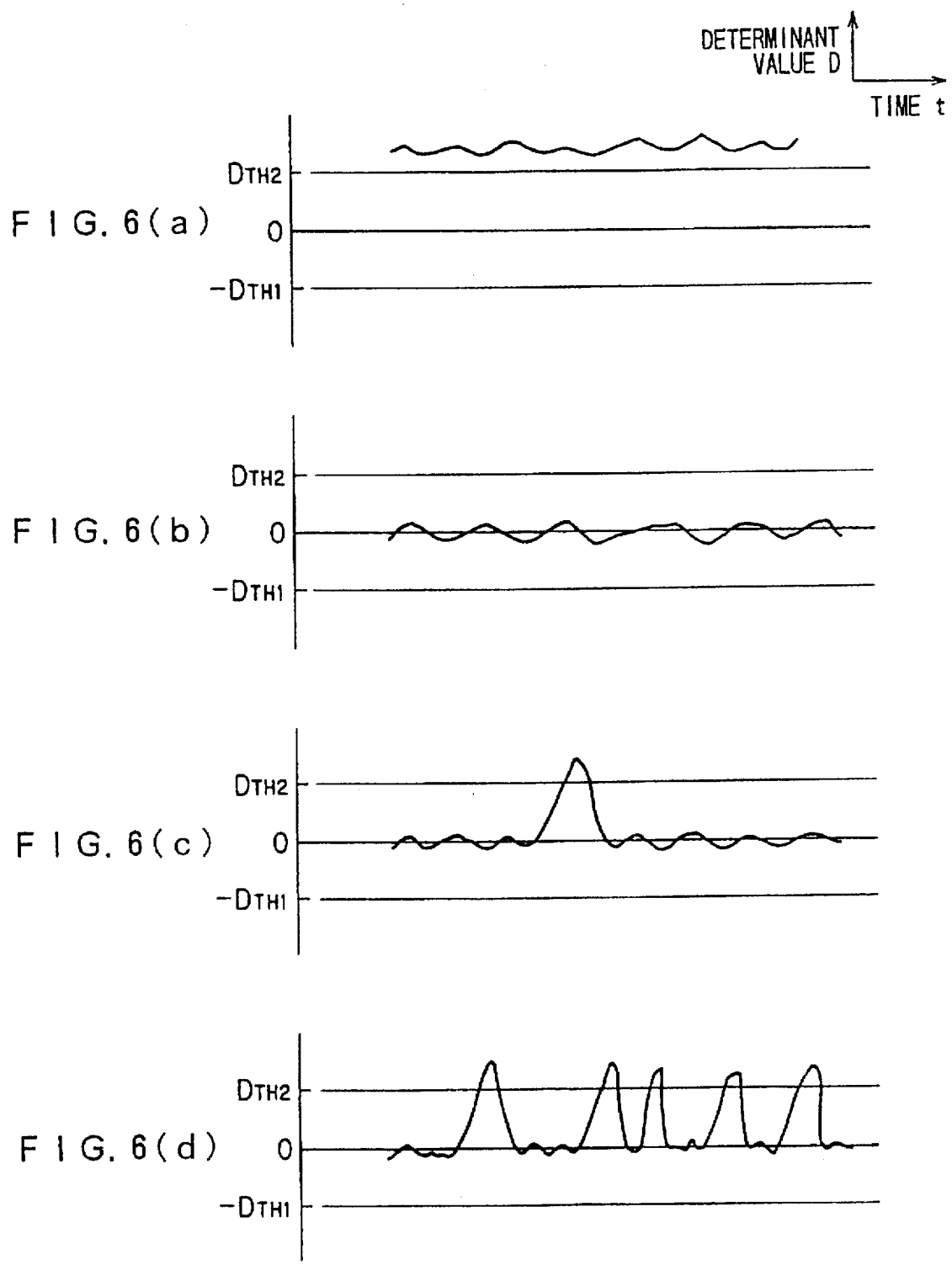
FIGS. 6(a) through 6(d) are each graphical representation illustrating the fluctuation of determinant values over elapsed time.

Further, in consideration of such influential factors as vehicle traveling state (including the velocity of the vehicle, the radius of curvature of a road on which the vehicle is traveling, and lateral and forward/backward accelerations of the vehicle) and the state of the road, the warning is not issued immediately after the determinant value D satisfies the inequality (30), but the counter CNT is incremented instead. More specifically, if there exists any tire $W_i$ having a reduced air pressure, a state where the determinant value D satisfies the inequality (30) continues, as shown in FIG. 6(a). On the other hand, if all the tires $W_i$ have a normal air pressure, a state where the determinant value D does not satisfy the inequality (30) continues, as shown in FIG. 6(b). However, even if all the tires $W_i$ have a normal pressure, the calculated rotational angular velocities $F_i$ may be temporarily fluctuated due to the influence of the vehicle traveling state and road state, and the determinant value D may temporarily satisfy the inequality (30), as shown in FIG. 6(c). In such a case, a warning immediately issued is erroneous. Therefore, for the prevention of such an erroneous warning, a warning is not issued immediately, but the counter CNT is incremented instead, in accordance with this embodiment.

However, only with the incrementation of the counter CNT, the count value C is continuously increased by temporary fluctuation of the determinant value D intermittently occurring due to the influence of the vehicle traveling state and road state, even if all the tires $W_i$ have a normal air pressure. This may result in an erroneous detection of the reduction in the air pressure of tire $W_i$. In this embodiment, to eliminate this problem, the counter CNT is decremented, if the determinant value D does not satisfy the inequality (30).

Further, the counter CNT may be otherwise imparted with a hysteresis characteristic. That is, a predetermined value is added to the count value C only when the count value C reaches the upper counting limit $L_1$.

After the counter CNT is incremented or decremented, the CPU 2b judges whether or not the count value C of the counter CNT is not less than a predetermined warning threshold count $N_1$ (for example, $N_1=L_1=10$) which is set to a value of the upper counting limit $L_1$ or lower (step S6). If it is judged that the count value C is not less than the warning threshold count $N_1$, the CPU 2b judges that there exists a tire $W_i$ having a reduced air pressure, and issues a warning by way of the display device 4 (see FIG. 4) (step S7), which will be described later.

Figure 7A:
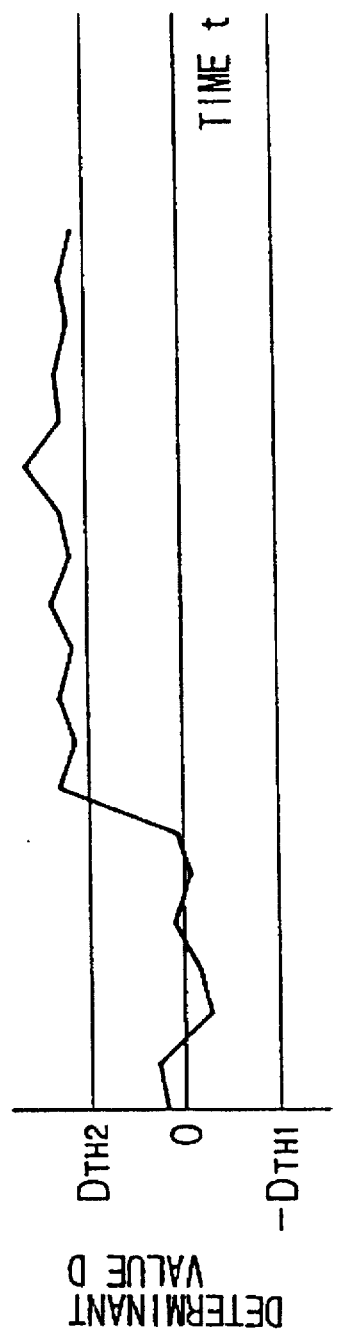
FIGS. 7(a) and 7(b) are each graphical representation for explaining a state in which erroneous judgements are continuously made when a tire air pressure is normal.
Figure 7B:
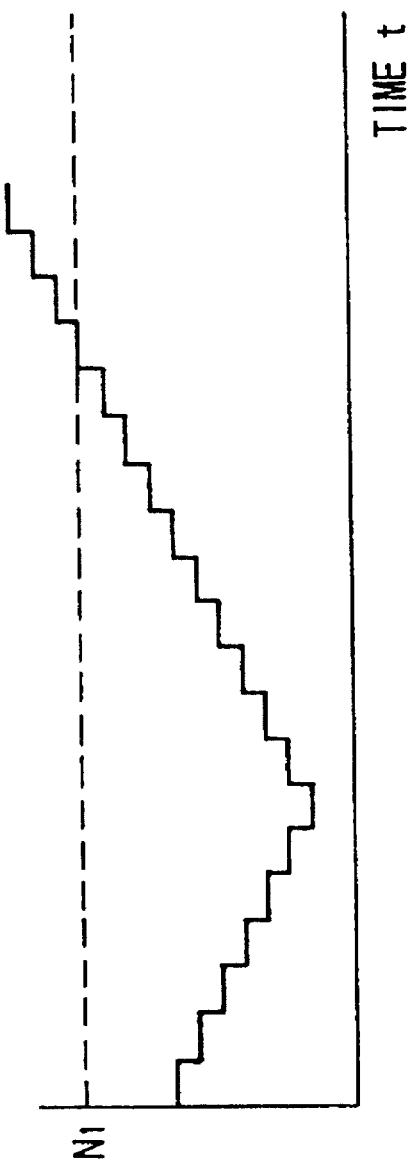

In the case that the vehicle is, for example, traveling a relatively long distance on a curved road when all the tires $W_i$ have a normal pressure, a lateral G is continuously applied to the vehicle and, therefore, the rotational angular velocities $F_i$ are fluctuated continuously, not temporarily. For this reason, a state where the determinant value D satisfies the inequality (30) continues, as shown in FIG. 7(a). Accordingly, the count value C is continuously increased, and finally exceeds the warning threshold count $N_1$, as shown in FIG. 7(b). Because a warning issued when the count value C exceeds the warning threshold count $N_1$ as shown in FIG. 7(b) is erroneous, it is necessary to immediately stop such an erroneous warning.

One method of stopping erroneous warning is to stop the warning when the count value C becomes less than the warning threshold count $N_1$. In accordance with this method, however, the warning issued when there actually exists any tire $W_i$ having a reduced air pressure can also be stopped, when it is mistakenly judged that the warning is based on an erroneous detection of the air-pressure reduction resulted from the influence of the vehicle traveling state and road state. Therefore, this method is not preferable.

To solve this problem, a warning stopping threshold count $N_2$ is preliminarily set to a value (for example, $N_2=L_2=0$) which is not less than the steady-state count $L_2$ and less than the warning threshold count $N_1$. If it is judged in the step S5 that the count value C is less than the warning threshold count $N_1$, it is judged whether the count value C is not greater than the warning stopping threshold count $N_2$ (step S8). Then, if it is judged that the count value C is not greater than the warning stopping threshold count $N_2$, the warning, if issued, is stopped (step S9). On the other hand, if it is judged that the count value C is greater than the warning stopping threshold count $N_2$, the current state is maintained.

Next, a warning process according to this embodiment will be described below.

This embodiment employs a warning process which can inform a driver not only that there exists any tire $W_1$ having a reduced air pressure, but also which tire. $W_i$ has a reduced air pressure. In this warning process, if the determinant value D calculated from the equation (29) described in the second embodiment is greater than 0, it is judged that either one of the tires $W_1$ and $W_4$ has a reduced air pressure, and if the determinant value D is less than 0, it is judged that either one of the tires $W_2$ and $W_3$ has a reduced air pressure. Then, the tire $W_i$ having a reduced air pressure is further identified in the following manner (in this case, it is assumed that the vehicle is traveling straight):

If $F_1>F_2$, the tire $W_1$ has a reduced air pressure.
If $F_1<F_2$, the tire $W_2$ has a reduced air pressure.
If $F_3>F_4$, the tire $W_3$ has a reduced air pressure.
If $F_3<F_4$, the tire $W_4$ has a reduced air pressure.

After the tire $W_i$ having a reduced air pressure is thus identified, the identification result is output to be displayed on the display device 4, as shown in FIG. 4. For example, one of four indicators corresponding to the four tires $W_1$ to $W_4$ is lit on the display device 4. If the tire $W_i$ having a reduced pressure can not be identified, these four indicators are simultaneously lit. Therefore, in most cases, the driver can recognize which tire $W_i$ has a reduced air pressure at a glance.

In accordance with this embodiment, since the warning is issued and stopped in consideration of such fluctuation factors as the vehicle traveling state and road state which temporarily affect the determinant value D, the frequent repetition of issuing and stopping the warning can be prevented. Therefore, the reliability of the warning against a driver can be significantly improved.

Further, even if cycle periods in which an erroneous judgement is made are intermittently observed when all the tires $W_i$ have a normal air pressure, the number of times that the count value C exceeds the warning threshold count $N_1$ is decreased, because the counter CNT is repeatedly incremented and decremented. Therefore, the frequency of the issuance of erroneous warnings can be reduced, compared with the conventional process.

Still further, in the case that cycle periods in which an erroneous judgement is made are continuously observed when all the tires $W_i$ have a normal air pressure, and a correct judgement is made before the count value C exceeds the warning threshold count $N_1$, the counter CNT is decremented. Accordingly, even if an erroneous judgement is subsequently made, the number of times that the count value C exceeds the warning threshold count $N_1$ is decreased. Therefore, the frequency of the issuance of the erroneous warnings can be reduced.

Yet further, in the case that cycle periods in which an erroneous judgement is made are continuously observed when all the tires $W_i$ have a normal air pressure, and a correct judgement is made after the count value C exceeds the warning threshold count $N_1$, an erroneous warning is issued. In accordance with this embodiment, however, since the count value C never exceeds the upper counting limit $L_1$ and the counter CNT is decremented insofar as correct judgements are made, the erroneous warning can be stopped immediately. Therefore, the driver can discriminate between a correct warning and an erroneous warning by judging whether the warning is stopped immediately or not.

IV. Third Embodiment

Figure 8:
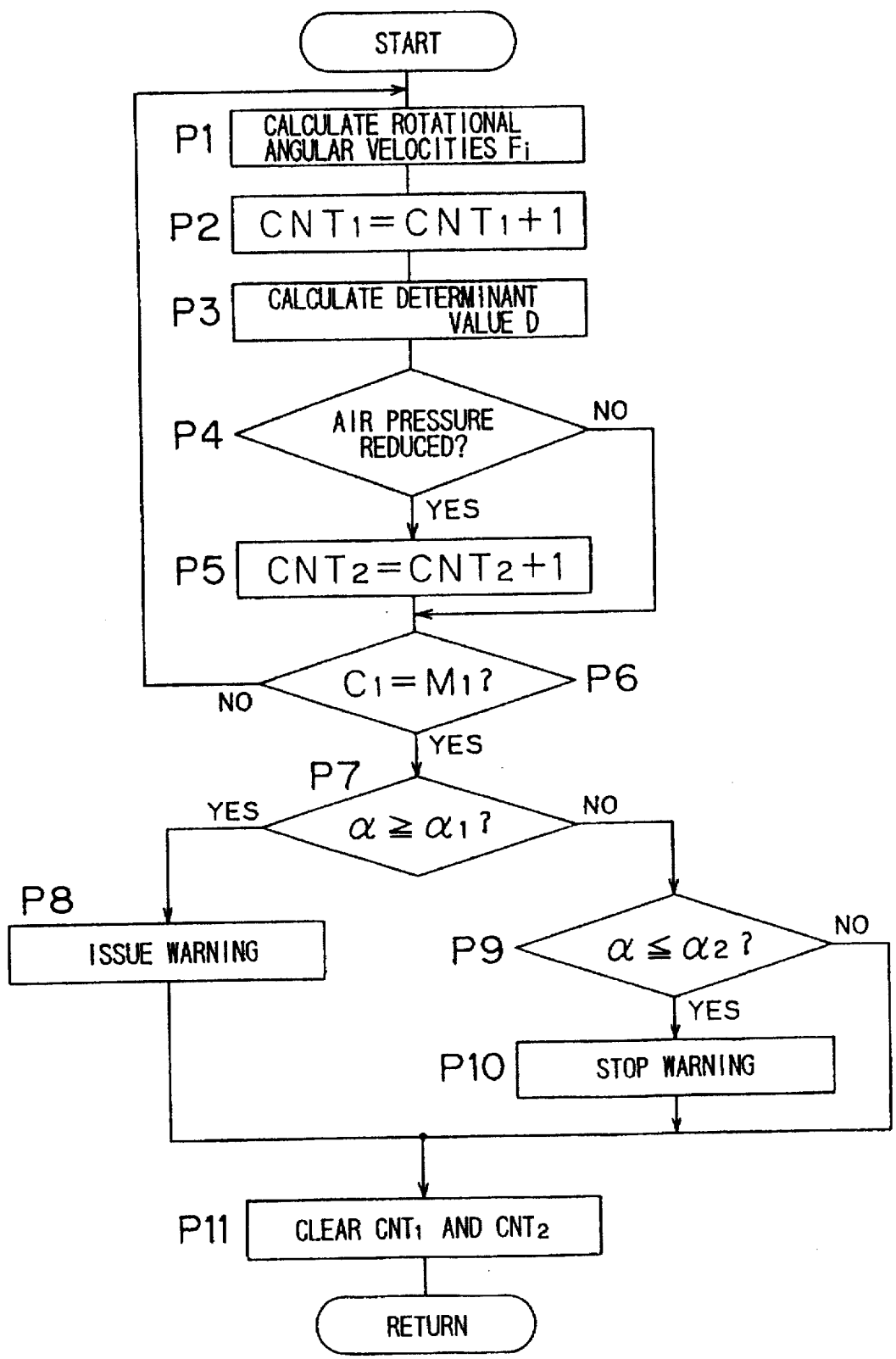
FIG. 8 is a flow chart illustrating a warning operation performed by a tire air-pressure reduction detecting apparatus according to a third embodiment of the present invention.

FIG. 8 is a flow chart illustrating a warning operation performed by a tire air-pressure reduction detecting apparatus according to a third embodiment of the present invention. Reference is made again to FIGS. 3 and 4 for the explanation of this embodiment. The warning operation according to this embodiment is also realized by way of a software processing.

In accordance with this embodiment, the reduction in the air pressure of tire $W_i$ is detected, based on the number of judgements that there exists a tire $W_i$ having a reduced air pressure which are made during a predetermined monitoring period $T_1$ equivalent to an integer multiple of a sampling cycle $\Delta T$ (sec).

More specifically, the CPU 2b calculates rotational angular velocities $F_i$ of the respective tires $W_i$ during the traveling of a vehicle (step P1), and increments a counter $CNT_1$ for measuring the monitoring period $T_1$ (step P2). (The counter $CNT_1$ is preliminarily cleared in a step P11.) Then, the CPU 2b calculates a determinant value D from the equation (29) described in the second embodiment, based on the calculated rotational angular velocities $F_i$ (step P3), and judges whether or not the calculated determinant value D satisfies the inequality (30) described in the second embodiment (step P4).

If the determinant value D satisfies the inequality (30), the CPU 2b increments a counter $CNT_2$ for counting the number of the judgements that the air pressure of tire $W_i$ is reduced (step P5). (The counter $CNT_2$ is preliminarily cleared in a step P11.) Thereafter, the CPU 2b judges whether or not the monitoring period $T_1$ is elapsed and whether or not a count value $C_1$ of the counter $CNT_1$ reaches a predetermined monitoring period ending count $M_1$ (step P6). If the count value $C_1$ does not reach the monitoring period ending count $M_1$, the foregoing steps P1 through P6 are repeated again.

On the other hand, if it is judged in the step P4 that the determinant value D does not satisfy the inequality (30), the counter $CNT_2$ is not incremented, and the process directly goes into the step P6.

If it is judged in the step S6 that the count value $C_1$ reaches the monitoring period ending count $M_1$, the CPU 2b calculates a ratio $\alpha$ ($\alpha=C_2/M_1$) of the count value $C_2$ of the counter $CNT_2$ to the monitoring period ending count $M_1$, and then judges whether or not the calculated ratio $\alpha$ is not less than a predetermined warning threshold $\alpha_1$ (for example, $\alpha_1=0.8$) (step P7). If the ratio a is not less than the warning threshold $\alpha_1$, the warning is issued by way of the display device 4 (step P8).

Figure 10A:
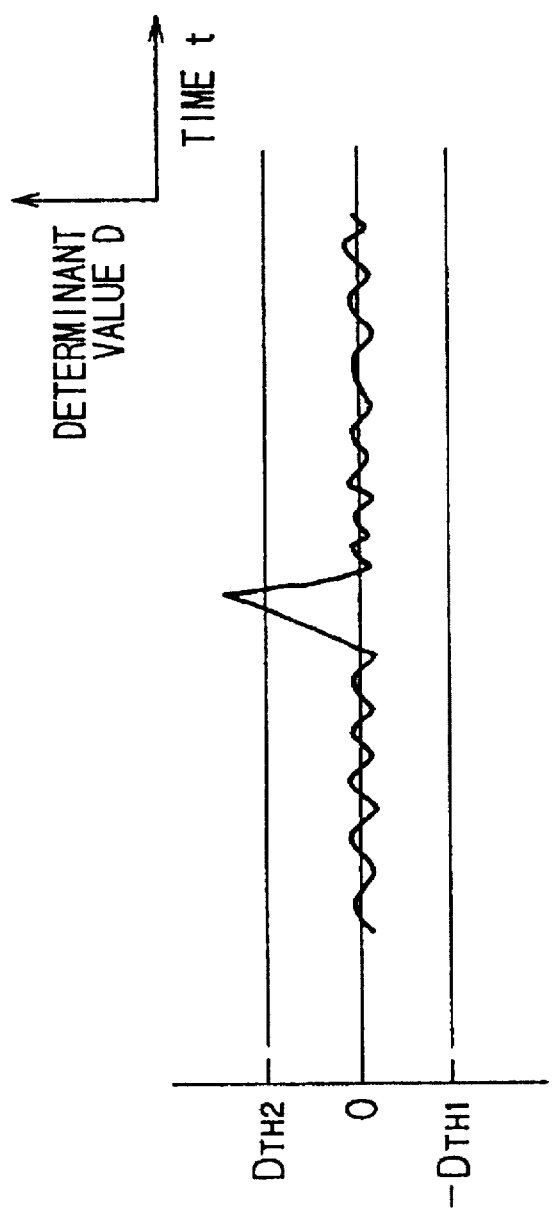
FIGS. 10(a) and 10(b) are each graphical representation for explaining states in which an erroneous judgement is made when a tire air pressure is normal and when the tire air pressure is reduced.
Figure 10B:
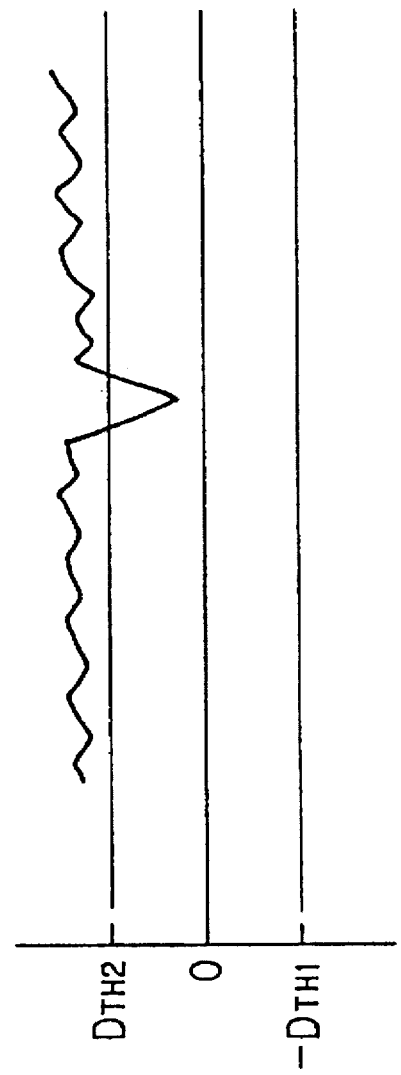

Even if there exists any tire $W_i$ having a reduced air pressure, the determinant value D may temporarily fall within a range between $-D_{TH1}$ and $D_{TH2}$ due to the influence of the vehicle traveling state and road state, as shown in FIG. 10(b) to which reference is made for the explanation in "BACKGROUND OF THE INVENTION". This results in an erroneous judgement that all the tires $W_i$ have a normal air pressure. However, such a temporary phenomenon occurs with a very little probability during one monitoring period. Therefore, if the ratio G is not less than the warning threshold $\alpha_1$, a correct judgement that there exists any tire $W_i$ having a reduced air pressure can be assuredly made.

On the other hand, even if all the tires $W_i$ have a normal pressure, a state where the determinant value D satisfies the inequality (30) may continue, as shown in FIG. 7(a), for example, when the vehicle is traveling a relatively long distance on a curved road. In such a case, there is a possibility that the ratio $\alpha$ exceeds the warning threshold $\alpha_1$ and, if so, an erroneous warning is issued, which should be stopped immediately. However, in the case that there actually exists any tire $W_i$ having a reduced air pressure, it is not preferable to stop a correct warning when an erroneous judgement that all the tires $W_i$ have a normal air pressure is made due to the influence of the vehicle traveling state and road state.

To solve this problem, there is preliminarily set a warning stopping threshold $\alpha_2$ (for example, $\alpha_2=0.2$) which is less than the warning threshold $\alpha_1$, in accordance with this embodiment. If it is judged in the step P7 that the ratio $\alpha$ is less than the warning threshold $\alpha_1$, it is judged whether or not the ratio $\alpha$ is less than the warning stopping threshold $\alpha_2$ (step P9). Then, if it is judged that the ratio $\alpha$ is less than the warning stopping threshold $\alpha_2$, the warning, if issued, is stopped (step P10). Thereafter, the counters $CNT_1$ and $CNT_2$ are cleared (step P11). On the other hand, if it is judged that the ratio $\alpha$ exceeds the warning stopping threshold $\alpha_2$, the counters $CNT_1$ and $CNT_2$ are cleared, and then the current state is maintained.

In accordance with this third embodiment, similarly to the second embodiment, the warning is issued and stopped in consideration that erroneous judgements due to such influential factors as the vehicle traveling state and the like are not continuously made. Therefore, the reliability of the warning against a driver can be improved.

V. Fourth Embodiment

Figure 9:
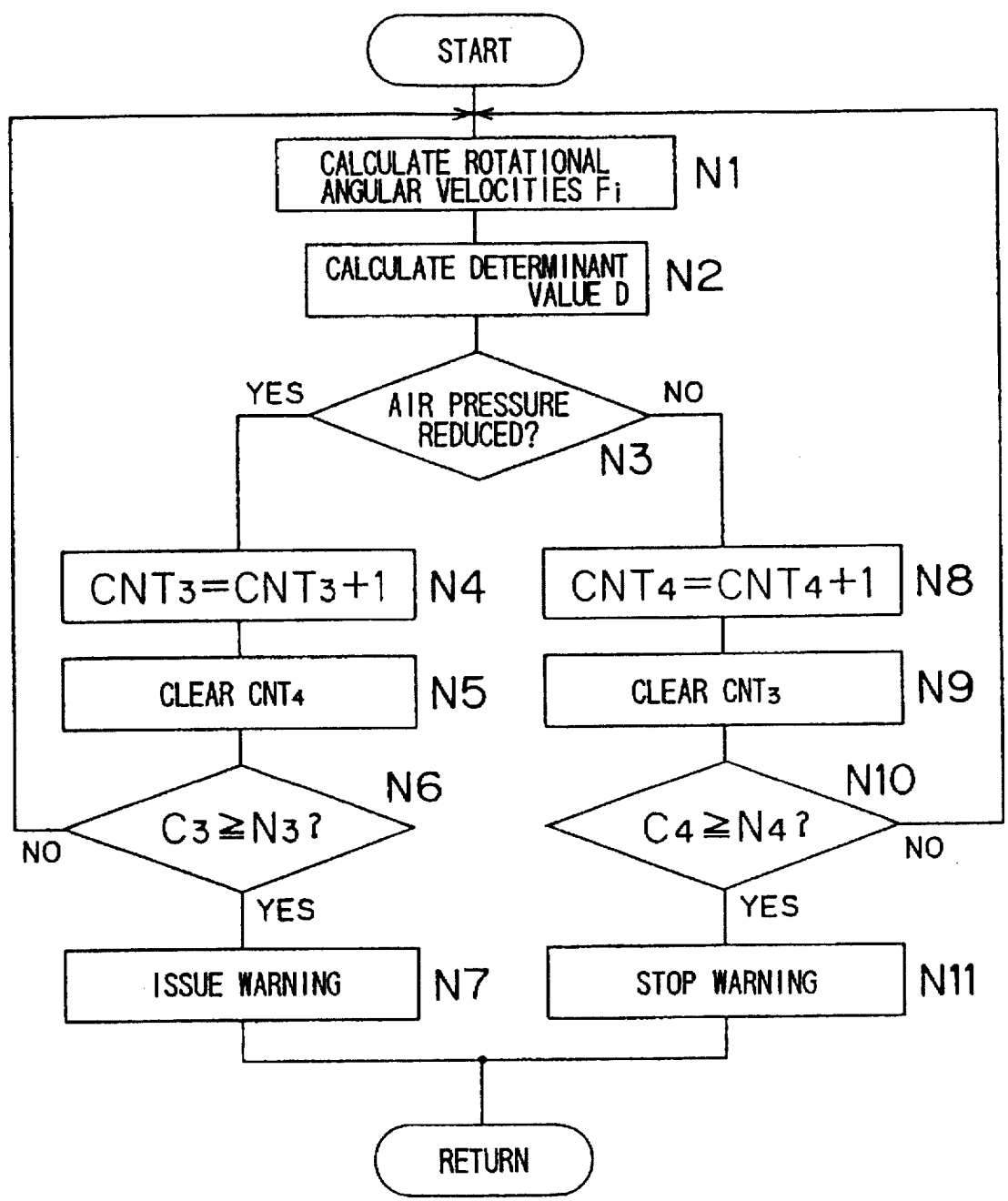
FIG. 9 is a flow chart illustrating a warning-issuing operation performed by a tire air-pressure reduction detecting apparatus according to a fourth embodiment of the present invention.

FIG. 9 is a flow chart illustrating a warning operation performed by a tire air-pressure reduction detecting apparatus according to a fourth embodiment of the present invention. Reference is made again to FIGS. 3 and 4 for the explanation of this embodiment. The warning operation according to this embodiment is also realized by way of a software processing.

The CPU 2b calculates rotational angular velocities $F_i$ of the respective tires $W_i$ during the traveling of a vehicle (step N1). After calculating a determinant value D from the equation (29) described in the second embodiment based on the calculated rotational angular velocities $F_i$ (step N2), the CPU 2b judges whether or not the determinant value D satisfies the inequality (30) (step N3). If the determinant value D satisfies the inequality (30), the CPU 2b increments a counter $CNT_3$ (step N4), clears another counter $CNT_4$ (step N5), and judges whether or not a count value $C_3$ of the counter $CNT_3$ is not less than a predetermined warning threshold count $N_3$ (step N6). If the count value $C_3$ is less than the warning threshold count $N_3$, the process returns to the step N1, and if the count value $C_3$ is not less than the warning threshold count $N_3$, a warning is issued by way of the display device 4 (step N7).

On the other hand, if the determinant value D does not satisfy the inequality (30), the CPU 2b increments the counter $CNT_4$ (step N8), clears the counter $CNT_3$ (step N9), and judges whether or not the count value $C_4$ is not less than a predetermined warning stopping threshold count $N_4$ (step N10). If the count value $C_4$ is less than the warning stopping threshold count $N_4$, the process returns to the step N1, and if the count value $C_4$ is not less than the warning stopping threshold count $N_4$, the warning, if issued, is stopped (step N11).

In accordance with the fourth embodiment of the present invention, the warning is issued only when cycle periods in which it is judged that there exists a tire $W_i$ having a reduced air pressure are continuously observed. Therefore, the frequency of the issuance of erroneous warnings can be reduced. Thus, the reduction in the air pressure can be assuredly judged.

Further, even if an erroneous warning is issued when all the tires $W_i$ have a normal air pressure, the erroneous warning can be immediately stopped, because the tire air-pressure reduction detecting apparatus has a warning stopping function. Still further, if a correct warning is issued when there exists any tire $W_i$ having a reduced air pressure, the apparatus can prevent the correct warning from being mistakenly stopped.

Having thus described the present invention by way of the second to fourth embodiments, it will be understood that the present invention is not limited to the specifics thereof. For example, though the counter CNT is incremented when it is judged that all the tires $W_i$ have a normal air pressure, and decremented when it is judged that there exists any tire $W_i$ having a reduced air pressure in accordance with the second invention, the incrementation and decrementation can be reversed. In such a case, the warning stopping threshold count and warning threshold count are set to counts $N_1$ and $N_2$, respectively.

Further, though the warning is issued by indicating in the display device 4 which tire $W_i$ has a reduced air pressure in the foregoing embodiments, the warning may be otherwise issued by way of an artificial voice or tones distinctive to the respective tires $W_i$ from a speaker and the like to inform a driver which tire $W_i$ has a reduced air pressure.

Alternatively, the warning is issued by means of a display device, speaker or the like to inform a driver only that there exists any tire $W_i$ having a reduced air pressure.

Still further, though the warning operation is realized by way of the software processing in the tire air-pressure reduction detecting apparatuses according to the foregoing embodiments, the warning operation may be otherwise realized by way of a hardware processing.

Yet further, though the upper counting limit $L_1$ and the steady-state count $L_2$ are set to the same values as the warning threshold count $N_1$ and the warning stopping threshold count $N_2$, respectively, in the foregoing embodiments, the counts $L_1$, $N_1$, $L_2$ and $N_2$ can be set so as to satisfy the relation $L_1 \geq N_1 > N_2 \geq L_2$.

VI. Fifth Embodiment

Figure 12:
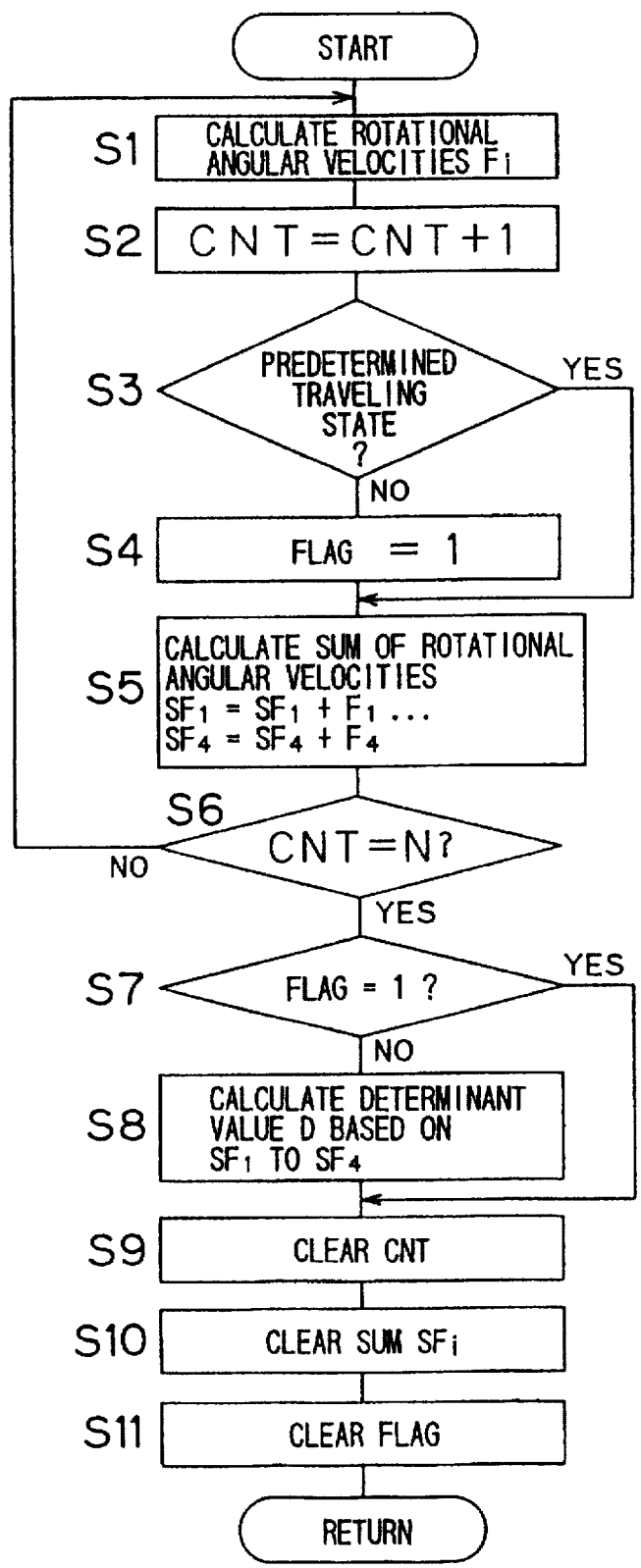
FIG. 12 is a flow chart illustrating an operation for judging whether or not a determinant value is calculated in a tire air-pressure reduction detecting apparatus.

FIG. 12 is a flow chart illustrating an operation for judging whether or not a determinant value is calculated in a tire air-pressure reduction detecting apparatus according to a fifth embodiment of the present invention. This operation is realized by way of a software processing. A sampling cycle $\Delta T$ (sec) and a cycle in which it is judged whether or not the determinant value should be calculated for judging whether or not there exists a tire $W_i$ having a reduced air pressure are referred to as "cycle of first time period" and "cycle of second time period", respectively.

The CPU 2b calculates rotational angular velocities $F_i$ of the respective tires $W_i$ on the cycle of the first time period, based on wheel velocity pulse signals output from the wheel velocity sensors 1 (step S1), and increments a counter CNT for measuring a time period (step S2). (The counter CNT is preliminarily cleared in a step S9.) Then, the CPU 2b detects a vehicle traveling state, and judges whether or not the detected vehicle traveling state is a predetermined traveling state (step S3).

The vehicle traveling state includes such factors as the velocity of a vehicle, the radius of curvature of a road on which the vehicle is traveling, the lateral G applied to the vehicle, of the forward/backward acceleration of the vehicle. The predetermined traveling state means the one which is suitable for detecting the reduction in the air pressure.

There will be hereinafter described a process for detecting the vehicle traveling state and a process for judging whether or not the detected vehicle traveling state is suitable for detecting the reduction in the air pressure.

First, in the process for detecting the vehicle traveling state, the velocity of the vehicle is calculated from an equation $V=(V_1+V_2+V_3+V_4)/4$ based on the velocities $V_i$ of the respective tires $W_i$ which are calculated from an equation $V_i=r \times F_i$ (where r is a dynamic load radius of tire $W_i$).

The radius R of curvature of a road is calculated from the following equation (31), based on the rotational angular velocities $F_3$ and $F_4$ of the rear left and right tires $W_3$ and $W_4$.

$$R = \frac{F_4 + F_3}{F_4 - F_3} \times \frac{T_w}{2} \quad (31)$$

where Tw is a tread width.

Further, the lateral G is calculated from the following equation (32), based on the rotational angular velocities $F_3$ and $F_4$ of the rear left and right tires $W_3$ and $W_4$.

$$\text{Lateral } G = \frac{(F_4 - F_3) \times (F_4 + F_3) \times r^2}{2 \times T_w \times 9.8} \quad (32)$$

Still further, the forward/backward acceleration A is calculated from the following equation (33), based on the velocity of the vehicle V.

$$A=(V-VB)/\Delta T \times 9.8 \quad (33)$$

where VB is a velocity of the vehicle calculated in the last cycle of first time period.

The vehicle velocity V, curvature radius R, lateral G and forward/backward acceleration A may be otherwise directly obtained by means of the corresponding sensors.

Next, in the judging process, if all of the following conditions are satisfied, for example, it is judged that the detected vehicle traveling state is suitable for detecting the reduction in the air pressure.

① V≧10 (Km/h)

② IRI≧30 (m)

③ ILateral GI≦0.4 (G)

④ IAI≦0.1 (G)

These conditions are based on the following ground: Firstly, if the vehicle velocity V is lower than this level ①, the detecting accuracy of the wheel velocity sensors are considerably decreased and the rotational angular velocities $F_i$ are fluctuating due to the influence of the surface roughness of a road, when the vehicle is traveling at a low speed. Secondly, if the curvature radius R is less than this level ②, or if the lateral G is greater than this level ③, the tires $W_i$ are skidding and the rotational angular velocities $F_i$ are fluctuated. Lastly, if the forward/backward acceleration A is greater than this level ④, the tires $W_i$ are slipping and the rotational angular velocities $F_i$ are fluctuated.

If it is judged in the step S3 that the detected vehicle traveling state is not suitable for detecting the reduction in the air pressure, a flag indicative of this judgement is set (step S4), and sums $SF_i$ (=$SF_i+F_i$) of the rotational angular velocities $F_i$ are newly calculated by adding the rotational angular velocities $F_i$ to former sums $SF_i$ calculated in the last cycle of first time period (step S5). On the other hand, if it is judged that the detected vehicle traveling state is suitable for detecting the reduction in the air pressure, the process skips the step S4 and directly goes into the step S5 to newly obtain the sums $SF_i$.

Then, it is judged whether or not a count value of the counter CNT equals a predetermined value N (step S6). (The predetermined value N is preferably set to a value which has a stabilized standard deviation of the rotational angular velocities $F_i$ calculated during a constant-speed straight trial traveling.) If the count value does not equal the predetermined value N, the foregoing steps S1 through S6 are repeated. In this embodiment, as shown in FIG. 12, the cycle of second time period is N-times the cycle of first time period ($\Delta T$).

After the foregoing steps S1 through S6 are repeated and the count value reaches the predetermined value N, it is judged whether or not the flag is set (step S7). If the flag is set, it is judged that at least one of the N vehicle traveling states detected during the cycle of the second time period does not satisfy at least any one of the aforesaid conditions ① to ④, and the CPU 2b clears the count value, sums $SF_i$ and the flag without calculating the determinant value D for the detection of the tire air pressure (steps S9, S10 and S11). Then, the foregoing steps S1 through S7 are repeated. On the other hand, if the flag is not set, it is judged that all the N vehicle traveling states detected during the cycle of the second time period satisfy all the aforesaid conditions ① to ④, and the CPU 2b calculates the determinant value D from the following equation (34), based on the sums $SF_i$ (step S8).

$$D = \frac{\frac{SF_1 + SF_4}{2} - \frac{SF_2 + SF_3}{2}}{\frac{SF_1 + SF_2 + SF_3 + SF_4}{4}} \times 100(\%) \quad (34)$$

The count value, sums $SF_i$ and flag are thereafter cleared (step S9, S10 and S11) and the foregoing steps are repeated.

FIG. 11 is a diagram for explaining a general operation of the tire air-pressure reduction detecting apparatus. In FIG. 11, it is assumed that N=5. In FIG. 11(a), a symbol "o" denotes that the vehicle traveling state is judged to be suitable for the detection of the air-pressure reduction, while a symbol "x" denotes that the vehicle traveling state is judged not to be suitable for the detection of the air-pressure reduction. The numerals shown below the symbols "o" and "x" denote the count value of the counter CNT. FIG. 11(b) shows the judgement results of whether or not the determinant value D should be calculated after the cycle of the second time period.

As can be seen from FIGS. 11(a) and 11(b), if it is judged after the cycle of the second time period that five vehicle traveling states detected during the cycle of second time period are all suitable for the detection of the air-pressure reduction, the determinant value D is calculated. On the other hand, if it is judged that any of the vehicle traveling states is not suitable for the detection of the air-pressure reduction, the determinant value D is not calculated.

In accordance with this embodiment, since the cycle of the second time period for calculating the determinant value D is set to be N-times the cycle of the first time period, the obtained determinant value D has little influence of the road state. Further, the determinant value D is calculated only when it is judged after the cycle of second time period that N vehicle traveling states detected during the cycle of second time period are all suitable for the detection of the air-pressure reduction. Therefore, the determinant value D with little influence of the vehicle traveling state can be obtained at any time, compared with the conventional tire air-pressure reduction detecting process in which only the rotational angular velocities $F_i$ calculated when a tire $W_i$ slips or locks are excluded and not necessarily correct rotational angular velocities $F_i$ are employed for the judgement of the tire air-pressure reduction. Thus, the reduction in the air pressure can be assuredly detected.

After the determinant value D is calculated, it is judged whether or not there exists any tire $W_i$ having a reduced air pressure, based on the calculated determinant value D. This judgement process is based on the following inequality (35):

$$D < -D_{TH1} \text{ or } D > D_{TH2} \tag{35}$$

Figure 13:
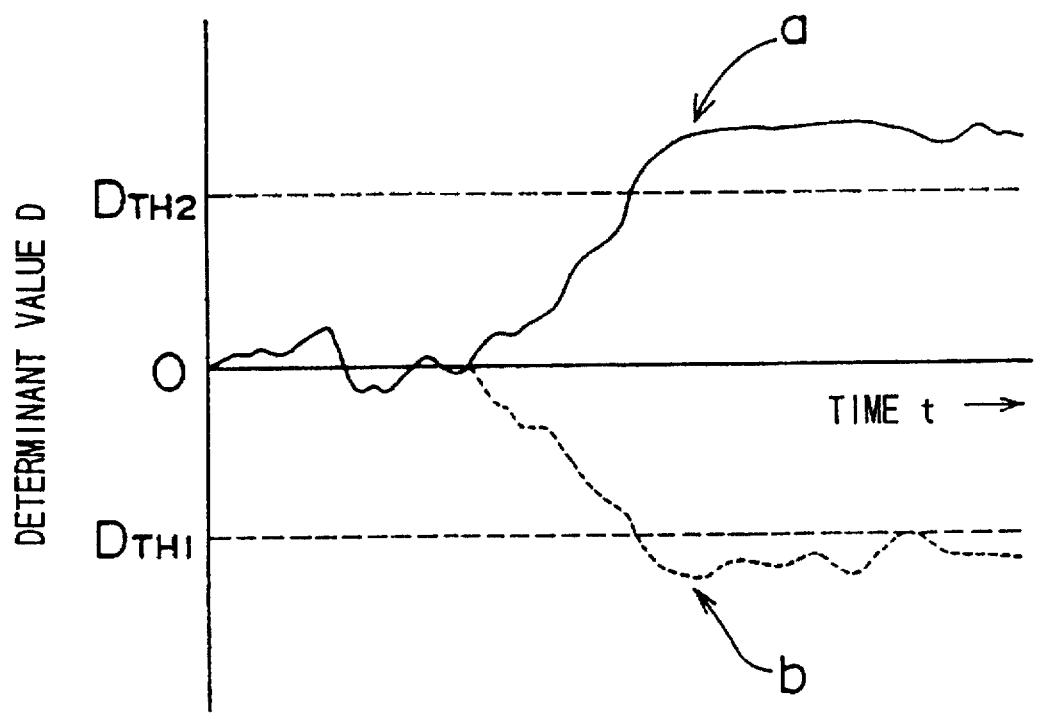
FIG. 13 is a graphical representation for explaining an air-pressure reduction judging process.

If the determinant value D is out of the range between $-D_{TH1}$ and $D_{TH2}$ as shown by characters a and b in FIGS. 13, that is, if the determinant value D satisfies the inequality (35), it is judged that there exists a tire $W_i$ having a reduced air pressure. On the other hand, if the determinant value D is within the range between $-D_{TH1}$ and $D_{TH2}$, that is, if the determinant value D does not satisfy the inequality (35), it is judged that there exists no tire having a reduced air pressure.

Thus, the reduction in the tire air pressure is detected during the traveling of the vehicle. When the reduction in the tire air pressure is detected, it is more convenient for the driver to be informed which tire has a reduced air pressure than to be informed of only the fact of the tire air-pressure reduction. Therefore, it is necessary to identify the tire $W_i$ having a reduced air pressure. The identification method has already been detailed in the second embodiment with reference to FIG. 4 and, therefore, will not be described here.

VII. Sixth Embodiment

Figure 14:
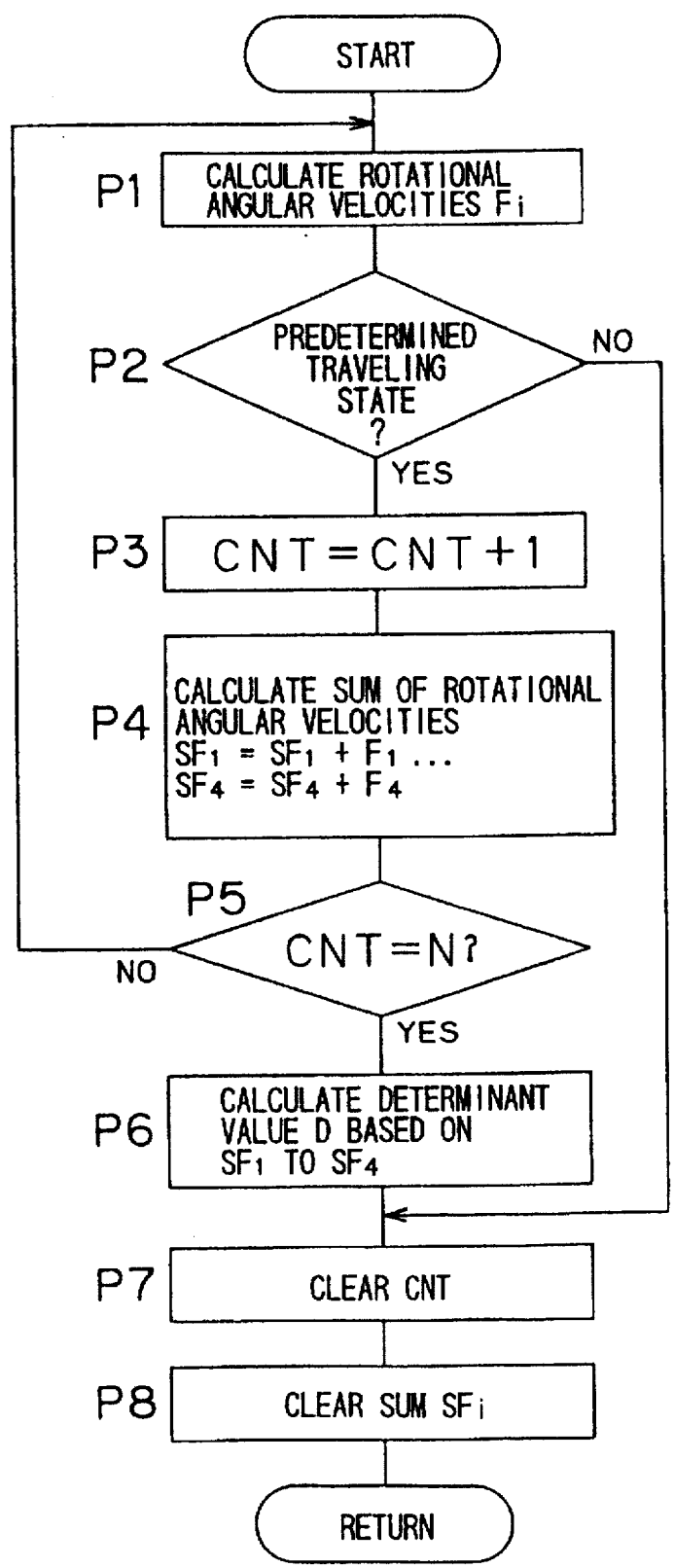
FIG. 14 is a flow chart illustrating an operation for judging whether or not a determinant value is calculated in a tire air-pressure reduction detecting apparatus according to a sixth embodiment of the present invention.

FIG. 14 is a flow chart illustrating an operation for judging whether or not a determinant value is calculated in a tire air-pressure reduction detecting apparatus according to a sixth embodiment of the present invention. Reference is made again to FIGS. 3 and 4 for the explanation of this embodiment.

The CPU 2b calculates rotational angular velocities $F_i$ during the traveling of a vehicle (step P1), detects a vehicle traveling state and judges whether or not the detected vehicle traveling state is suitable for detecting the reduction in the tire air pressure (step P2). If it is judged that the vehicle traveling state is not suitable for detecting the reduction in the air pressure, the CPU 2b clears a counter CNT for counting the number of the judgements that the vehicle traveling state is suitable for detecting the reduction in the air pressure (step P7), and then clears sums of the rotational angular velocities which will be described later (step P8).

On the other hand, if it is judged that the vehicle traveling state is suitable for detecting the reduction in the air pressure, the CPU 2b increments the counter CNT (step P3), and newly calculates sums $SF_i$ of the rotational angular velocities (step P4). Then, the CPU 2b judges whether or not the count value of the counter CNT is a predetermined count N (step P5). If the counter value is not the predetermined count N, the process returns to the step P1, and the foregoing steps P1 through P5 are repeated. On the other hand, the count value is the predetermined count N, the determinant value D is calculated from the equation (34) described in the aforesaid fifth embodiment, based on the sums $SF_i$ (step P6). Thereafter, the counter CNT and the sums $SF_i$ are cleared (steps P7 and P8).

FIG. 15 is a diagram for explaining a general operation of the tire air-pressure reduction detecting apparatus according to the sixth embodiment. In FIG. 15, it is assumed that N=5. FIG. 15(a) shows the judgement results of whether or not the determinant value D should be calculated, in accordance with the fifth embodiment. FIG. 15(b) shows the judgement results of whether or not the vehicle traveling state is suitable for detecting the reduction in the air pressure, in accordance with this sixth embodiment, in which numerals 1 to 5 shown below the symbols "o" and "x" denote the count values x of the counter CNT in accordance with this embodiment and numerals (1) to (5) shown above the symbols "o" and "x" denote the count values of the counter CNT in accordance with the aforesaid fifth embodiment. FIG. 15(c) shows the judgement results of whether or not the determinant value D should be calculated, in accordance with this embodiment.

As can be seen from FIG. 15(c), in accordance with this embodiment, the cycle of the second time period is cleared when the cycle of the first time period marked with the symbol "o" is continuously repeated five times as shown in FIG. 15(b), and when the cycle of the first time period marked with the symbol "x" is observed as shown in FIG. 15(b). Therefore, the rotational angular velocities $F_i$ calculated in the cycles of the first time period marked with the symbol "o" which are enclosed by a square in FIG. 15(b) can be utilized for the calculation of the determinant value D. These rotational angular velocities $F_i$ are not utilized in accordance with the aforesaid fifth embodiment, even though it is judged that the vehicle traveling state is suitable for detecting the reduction in the air pressure. Thus, this embodiment realizes a more accurate and quick detection of the air-pressure reduction than the aforesaid fifth embodiment.

VIII. Seventh Embodiment

Figure 16:
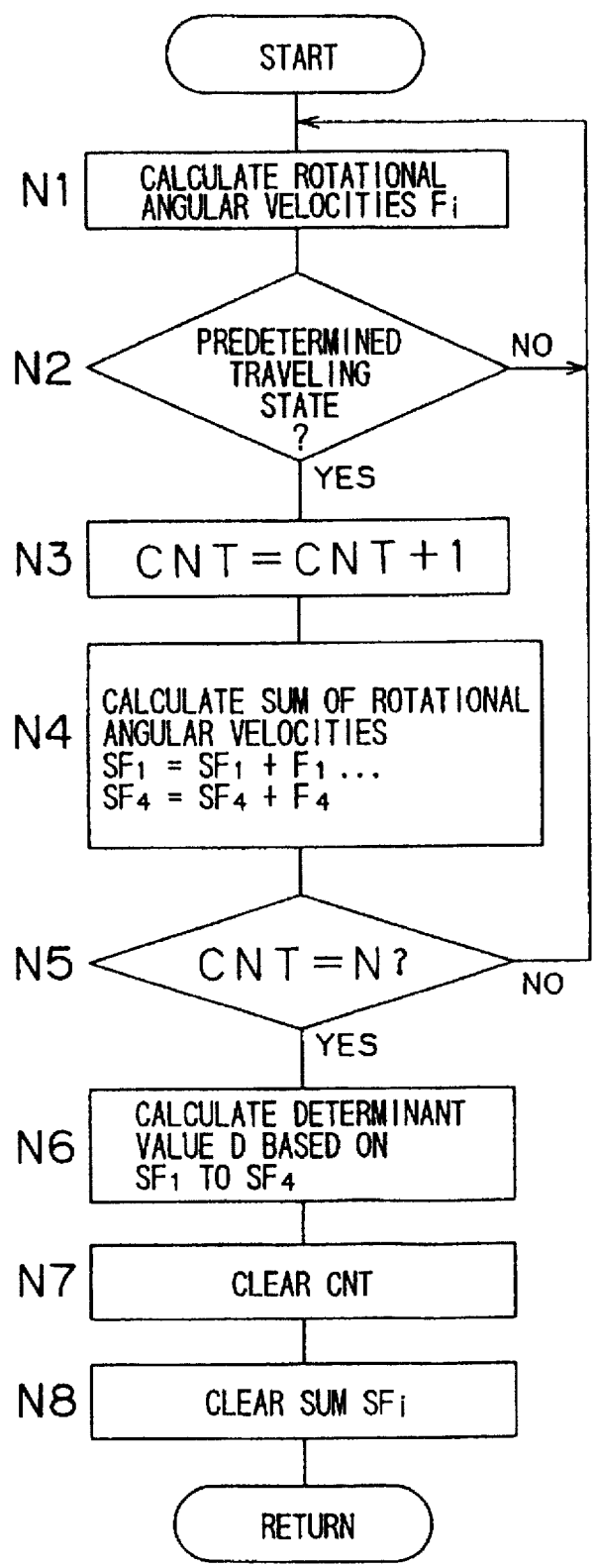
FIG. 16 is a flow chart illustrating an operation for judging whether or not a determinant value is calculated in a tire air-pressure reduction detecting apparatus according to a seventh embodiment of the present invention.

FIG. 16 is a flow chart illustrating an operation for judging whether or not a determinant value is calculated in a tire air-pressure reduction detecting apparatus according to a seventh embodiment of the present invention. Reference is made again to FIGS. 3 and 4 for the explanation of this embodiment.

The CPU 2b detects rotational angular velocities $F_i$ I0 during the traveling of a vehicle to detect a vehicle traveling state (step N1), and judges whether or not the detected vehicle traveling state is suitable for the detection of the reduction in the air pressure of any tire $W_i$ (step N2). If it is judged that the detected vehicle traveling state is not suitable for detecting the reduction in the air pressure, the foregoing steps N1 and N2 are repeated. On the other hand, if it is judged that the detected vehicle traveling state is suitable for detecting the reduction in the air pressure, the CPU 2b increments a counter CNT for counting the number of the judgements that the vehicle traveling state is suitable for the detection of the air-pressure reduction (step N3). (The counter CNT is preliminarily cleared in a step N7.) Then, the CPU 2b newly calculates sums $SF_i$ of the rotational angular velocities (step N4), and judges whether or not a count value of the counter CNT equals a predetermined value N (step N5). If the count value does not equal the predetermined value N, the foregoing steps N1 through N5 are repeated. On the other hand, if the count value equals the predetermined value N, a determinant value D is calculated from the determinant equation (34) described in the fifth embodiment, based on the sums $SF_i$ of the rotational angular velocities $F_i$ (step N6). Thereafter, the counter CNT and the sums $SF_i$ are cleared (steps N7 and N8).

FIG. 17 is a diagram for explaining a general operation of the tire air-pressure reduction detecting apparatus according to the seventh embodiment. In FIG. 17, it is assumed that N=5. FIG. 17(a) shows the judgement results of whether or not the determinant value D should be calculated, in accordance with the sixth embodiment. FIG. 17(b) shows the judgement results of whether or not the vehicle traveling state is suitable for the detection of the air-pressure reduction in accordance with this seventh embodiment, in which numerals 1 to 5 shown below the symbols "o" and "x" denote the count values of the counter CNT in accordance with this embodiment and numerals (1) to (5) shown above the symbols "o" and "x" denote the count values of the counter CNT in accordance with the aforesaid sixth embodiment. FIG. 17(c) shows the judgement results of whether or not the determinant value D should be calculated, in accordance with this embodiment.

As can be seen from FIG. 17(c), in accordance with this embodiment, the cycle of the second time period ends when the cycle of the first time period marked with the symbol "o" is continuously or intermittently observed five times as shown in FIG. 17(b), and the rotational angular velocities $F_i$ with little influence of the vehicle traveling state are all utilized for the calculation of the determinant value D. Therefore, the rotational angular velocities $F_i$ calculated in the cycle of the first time period marked with symbol "o" which is enclosed by a square in FIG. 17(b) can be also utilized for the calculation of the determinant value, though these rotational angular velocities $F_i$ are not utilized in accordance with the aforesaid sixth embodiment. Thus, this embodiment realizes a more accurate and quick detection of the air-pressure reduction than the aforesaid sixth embodiment.

IX. Eighth Embodiment

Figure 18:
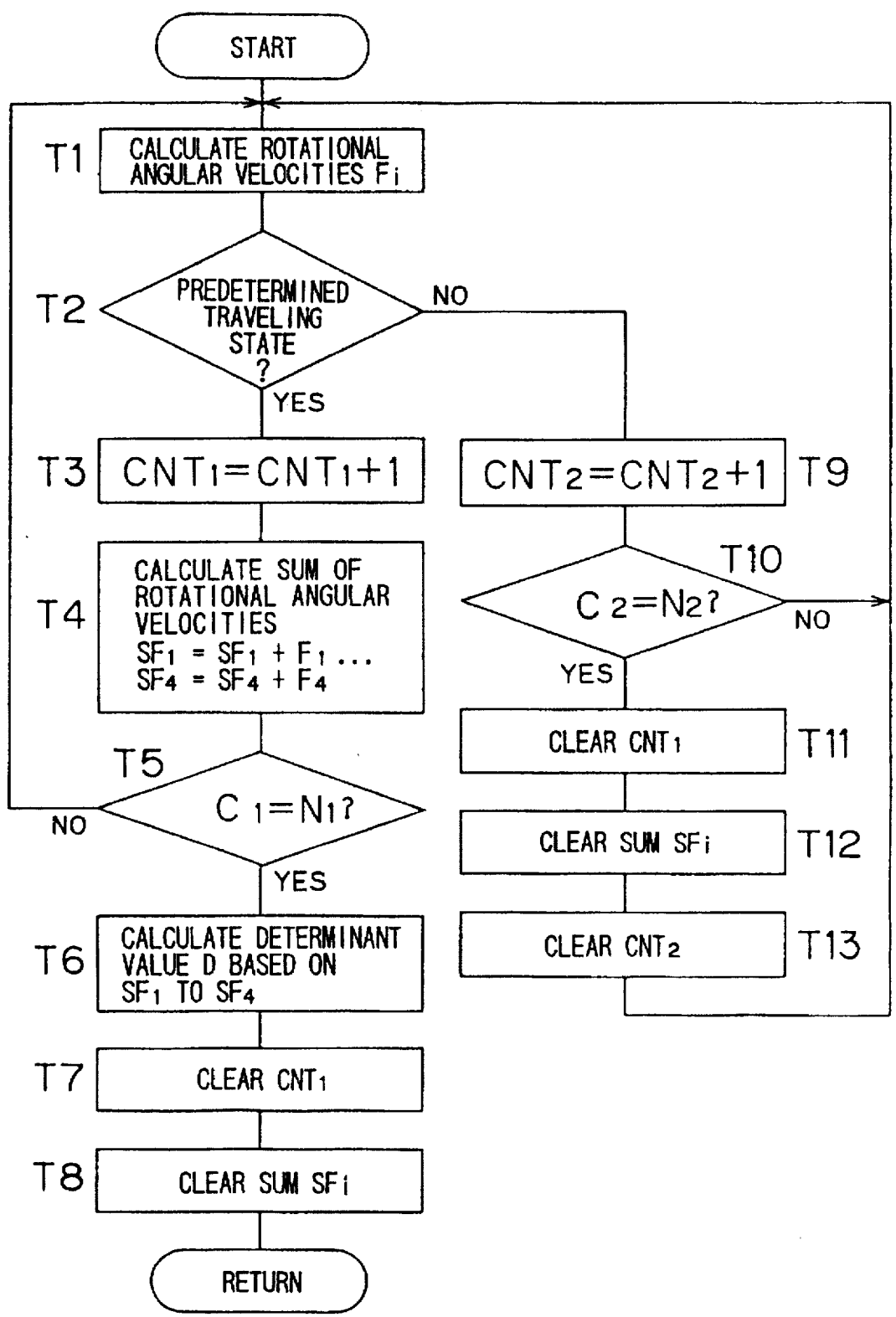
FIG. 18 is a flow chart illustrating an operation for judging whether or not a determinant value is calculated in a tire air-pressure reduction detecting apparatus according to an eighth embodiment of the present invention.

FIG. 18 is a flow chart illustrating an operation for judging whether or not a determinant value is calculated in a tire air-pressure reduction detecting apparatus according to an eighth embodiment of the present invention. Reference is made again to FIGS. 3 and 4 for the explanation of this embodiment.

The CPU 2b calculates rotational angular velocities $F_i$ during the traveling of a vehicle (step T1), detects a vehicle traveling state and judges whether or not the detected vehicle traveling state is suitable for the detection of the reduction in the tire air pressure (step T2).

If it is judged that the detected vehicle traveling state is suitable for detecting the reduction in the air pressure, the CPU 2b increments a counter $CNT_1$ for counting the number of the judgements that the vehicle traveling state is suitable for the detection of the air-pressure reduction (step T3). (The counter $CNT_1$ is preliminarily cleared in a step T7 or T11.) Then, the CPU 2b newly calculates sums $SF_i$ of the rotational angular velocities (step T4), and judges whether or not a count value $C_1$ of the counter $CNT_1$ equals a predetermined value $N_1$ (for example, $N_1$=5) (step T5). If the count value $C_1$ does not equal the predetermined value $N_1$, the process returns to the step T1. On the other hand, if the count value $C_1$ equals the predetermined value $N_1$, the determinant value D is calculated from the equation (34) described in the fifth embodiment, based on the sums $SF_i$ of the rotational angular velocities $F_i$ (step T6). Thereafter, the counter $CNT_1$ and the sums $SF_i$ are cleared (steps T7 and T8).

On the other hand, if it is judged in the step T2 that the detected vehicle traveling state is not suitable for detecting the reduction in the air pressure, a counter $CNT_2$ for counting the number of the judgements that the vehicle traveling state is suitable for the detection of the air-pressure reduction is incremented (step T9). (The counter $CNT_2$ is preliminarily cleared in a step T13.) Then, it is judged whether or not a count value $C_2$ equals a predetermined value $N_2$ (for example, $N_2$=30) (step T10). If the count value $C_2$ does not equal a predetermined value $N_2$, the process returns to the step T1. On the other hand, if the count value $C_2$ equals the predetermined value $N_2$, the counter $CNT_1$, the sums $SF_i$ calculated in the step T4 and the counter $CNT_2$ are all cleared (steps T11, T12 and T13).

Thus, if the judgement that the detected vehicle traveling state is not suitable for the detection of the air-pressure reduction is continuously made $N_2$ times, the determinant value D is not calculated, in accordance with this embodiment.

FIG. 19 is a diagram for explaining a general operation of the tire air-pressure reduction detecting apparatus according to the eighth embodiment. FIG. 19(a) shows the judgement results of whether or not the vehicle traveling state is suitable for the detection of the air-pressure reduction in accordance with this embodiment, in which numerals 1 to $N_1$ and (1) to ($N_2$) shown below symbols "o" and "x" denote the count values $C_1$ of the counter $CNT_1$ and the count values $C_2$ of the counter $CNT_2$, respectively. FIG. 19(b) shows the judgement results of whether or not the determinant value D should be calculated.

As can be seen from FIG. 19(b), in accordance with this embodiment, a second cycle is cleared when a first cycle marked with the symbol "o" is continuously repeated $N_1$ times as shown in FIG. 19(a), or when a first cycle marked with the symbol "x" is continuously repeated $N_2$ times as shown in FIG. 19(a).

If it is continuously judged that the vehicle traveling state is not suitable for the detection of the air-pressure reduction, this may cause a long time lag between the detections of the vehicle traveling state before and after such continuous judgements. Therefore, it is considered that the rotational angular velocities $F_i$ calculated before the continuous judgements have a different influence of the vehicle traveling state from those calculated after the continuous judgements. To obtain a more accurate determinant value D, it is preferable to use rotational angular velocities $F_i$ each calculated in a similar vehicle traveling state. Therefore, to carry out a more accurate detection of the air-pressure reduction, the cycle for judging whether or not the determinant value D should be calculated is renewed when the symbol "x" is continuously repeated $N_2$ times, even if the judging cycle becomes a little longer.

I claim:

1. A tire air-pressure reduction detecting apparatus comprising:

air-pressure reduction judging means for judging whether or not a tire air pressure is reduced;

counting means for incrementing or decrementing a count value depending upon whether a judgement result obtained by the air-pressure reduction judging means indicates that the tire air pressure is reduced or that the tire air pressure is not reduced, the counting means preventing the count value from falling below a predetermined steady-state count which supports a determination that the tire air pressure is not reduced; and warning means for issuing and stopping a warning in accordance with judgement results obtained by the air-pressure reduction judging means, the warning means issuing a warning when the count value reaches a predetermined warning threshold count which supports a determination that the tire air pressure is reduced.

2. A tire air-pressure reduction detecting apparatus as set forth in claim 1, wherein:

the counting means prevents the count value from exceeding a predetermined upper counting limit which supports the determination that the tire air pressure is reduced, and the warning means stops the warning when the count value reaches a predetermined warning stopping threshold count which supports the determination that the tire air pressure is not reduced.

3. A tire air-pressure reduction detecting apparatus comprising:

an air-pressure reduction judging means for judging whether or not a tire air pressure is reduced;

a time-measuring means;

a memory means for storing a count value of judgement results obtained by the air-pressure reduction judging means indicating that the tire air pressure is reduced;

a count judging means for judging, when a length of a time period measured by the time measuring means reaches a predetermined time length, i) whether or not the count value is not less than a predetermined first count value, and ii) whether or not the count value is less than a predetermined second count value which is set to be less than the predetermined first count value; and warning means for i) issuing a warning when the count judging means judges that the count value is not less than the predetermined first count value, and ii) stopping the warning when the count judging means judges that the count value is less than the predetermined second count value.

4. A warning issuing/stopping process for use in a tire air-pressure reduction detecting apparatus, comprising the steps of:

calculating rotational angular velocities of tires attached to a vehicle;

producing judgement results based on the calculated rotational angular velocities indicating whether or not a tire air pressure is reduced; and issuing and stopping a warning in accordance with the judgement results, such that the warning is issued when the counting of judgement results indicating that the tire air pressure is reduced is repeated a predetermined number of times, and the warning is stopped when the counting of judgement results indicating that the tire air pressure is not reduced is repeated a predetermined number of times.

* * * * *